United States Patent
Berstein et al.

(10) Patent No.: US 7,197,010 B1
(45) Date of Patent: Mar. 27, 2007

(54) SYSTEM FOR REAL TIME VOICE QUALITY MEASUREMENT IN VOICE OVER PACKET NETWORK

(75) Inventors: Alberto D. Berstein, Cupertino, CA (US); Mendy Segal, Santa Clara, CA (US); Wen Wang, Fremont, CA (US); Israel Yuval, Sunnyvale, CA (US)

(73) Assignee: Zhone Technologies, Inc., Oakland, CA (US)

( * ) Notice: Subject to any disclaimer, the term of this patent is extended or adjusted under 35 U.S.C. 154(b) by 455 days.

(21) Appl. No.: 09/885,373

(22) Filed: Jun. 20, 2001

(51) Int. Cl.
*H04L 12/26* (2006.01)

(52) U.S. Cl. ...................... 370/252; 370/356
(58) Field of Classification Search ........ 370/352–356, 370/252
See application file for complete search history.

(56) References Cited

U.S. PATENT DOCUMENTS

| | | | |
|---|---|---|---|
| 2002/0141392 A1* | 10/2002 | Tezuka et al. | 370/352 |
| 2002/0145979 A1* | 10/2002 | Baj | 370/242 |
| 2002/0167937 A1* | 11/2002 | Goodman | 370/352 |
| 2002/0193999 A1* | 12/2002 | Keane et al. | 704/270 |
| 2005/0141493 A1* | 6/2005 | Hardy et al. | 370/356 |
| 2005/0163052 A1* | 7/2005 | Savage et al. | 370/241 |
| 2006/0221942 A1* | 10/2006 | Fruth et al. | 370/356 |

\* cited by examiner

*Primary Examiner*—Melvin Marcelo
(74) *Attorney, Agent, or Firm*—Thomas, Kayden, Horstemeyer & Risley, LLP

(57) ABSTRACT

In assessing the capability of an IP based network to support toll telephony service, objective measurements of Speech Quality are taken. A module is used with Voice over Packet equipment that allows performance of voice quality measurements in real-time without using any external test equipment. A reference signal that includes a marker and a voice test signal is sent through the network from one Voice over Packet equipment containing or connected to the module to another. The received marker is compared to the reference marker to identify the onset time of the received voice test signal. The received and reference voice test signals are processed to measure the quality of the network. This may be implemented using the processing power and memory resources present in Voice over Packet equipment giving the network administrator an enhanced test capability at each node of the network. Voice quality measurements may be generated in a transparent way for the callers in real-time under severely degraded conditions of the network.

67 Claims, 10 Drawing Sheets

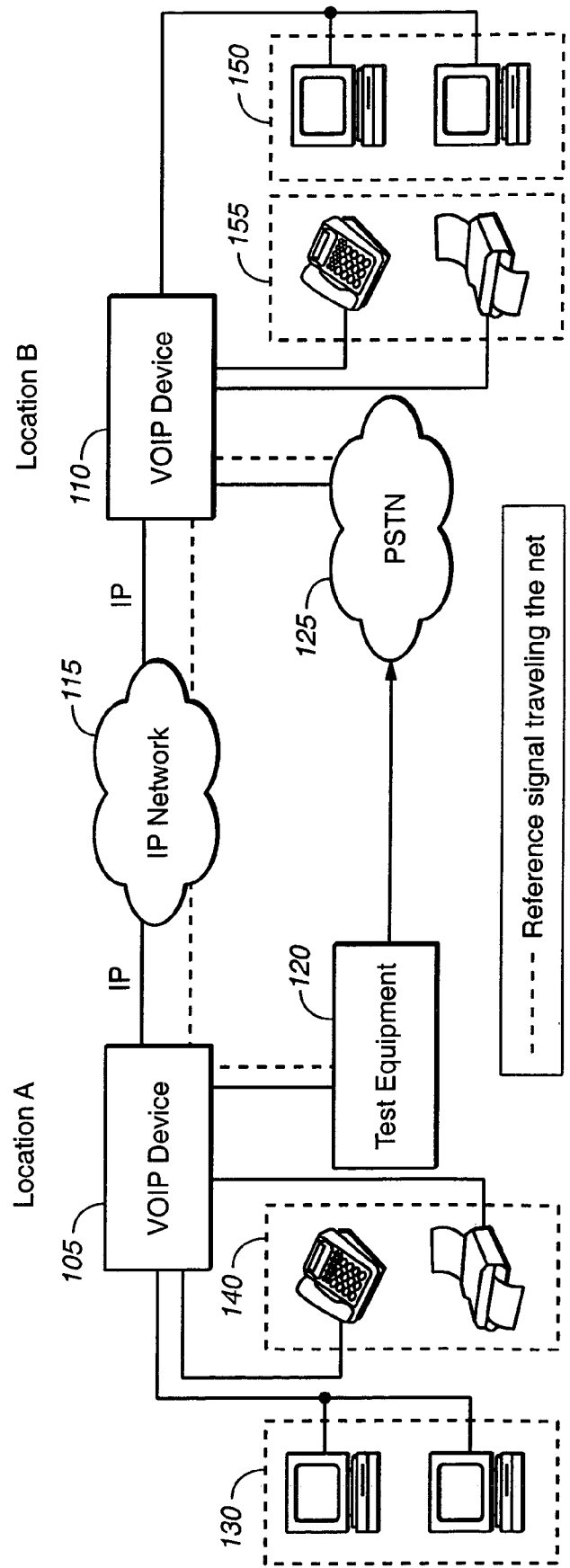
FIG._1  PRIOR ART

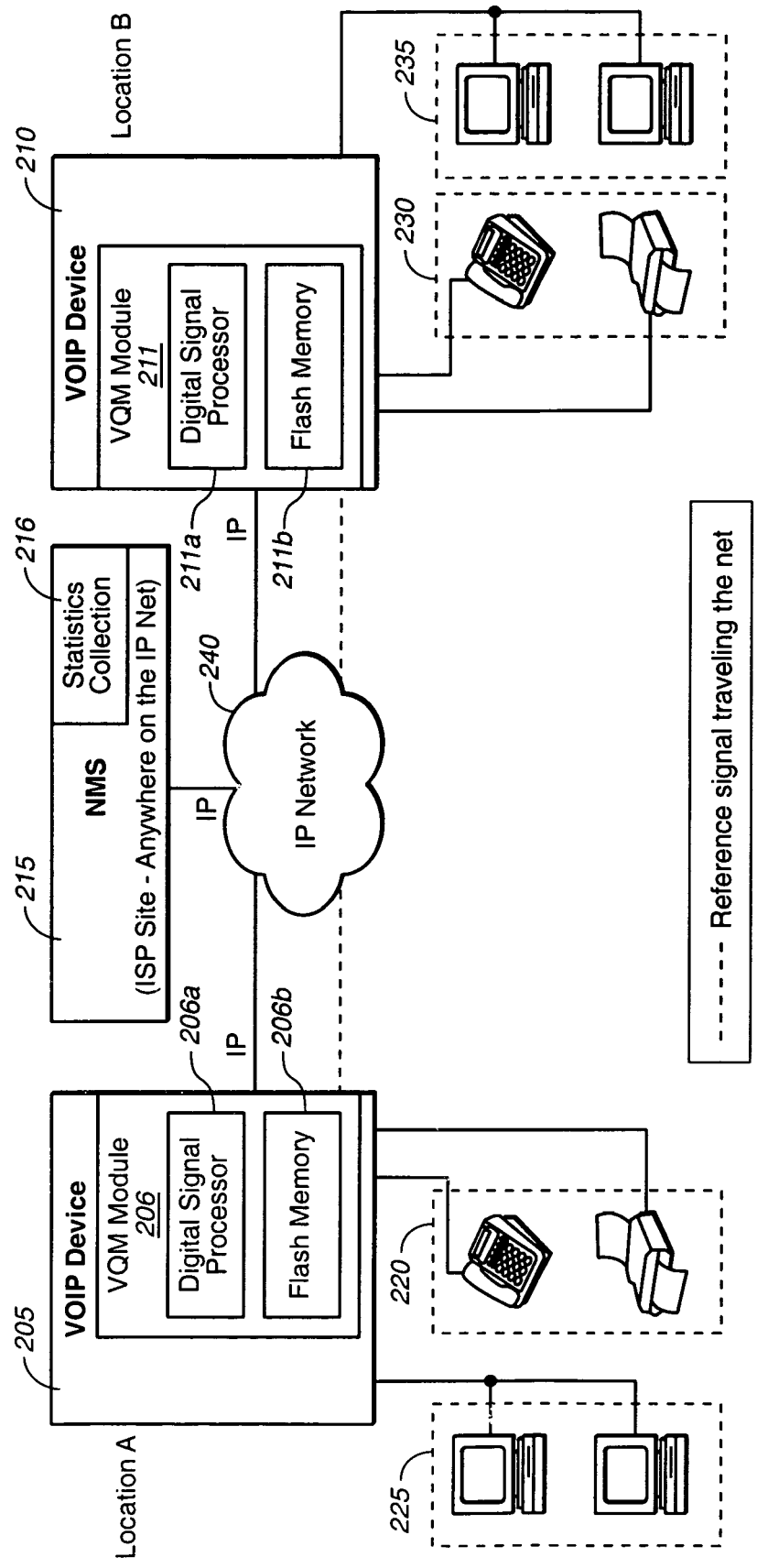
FIG._2a

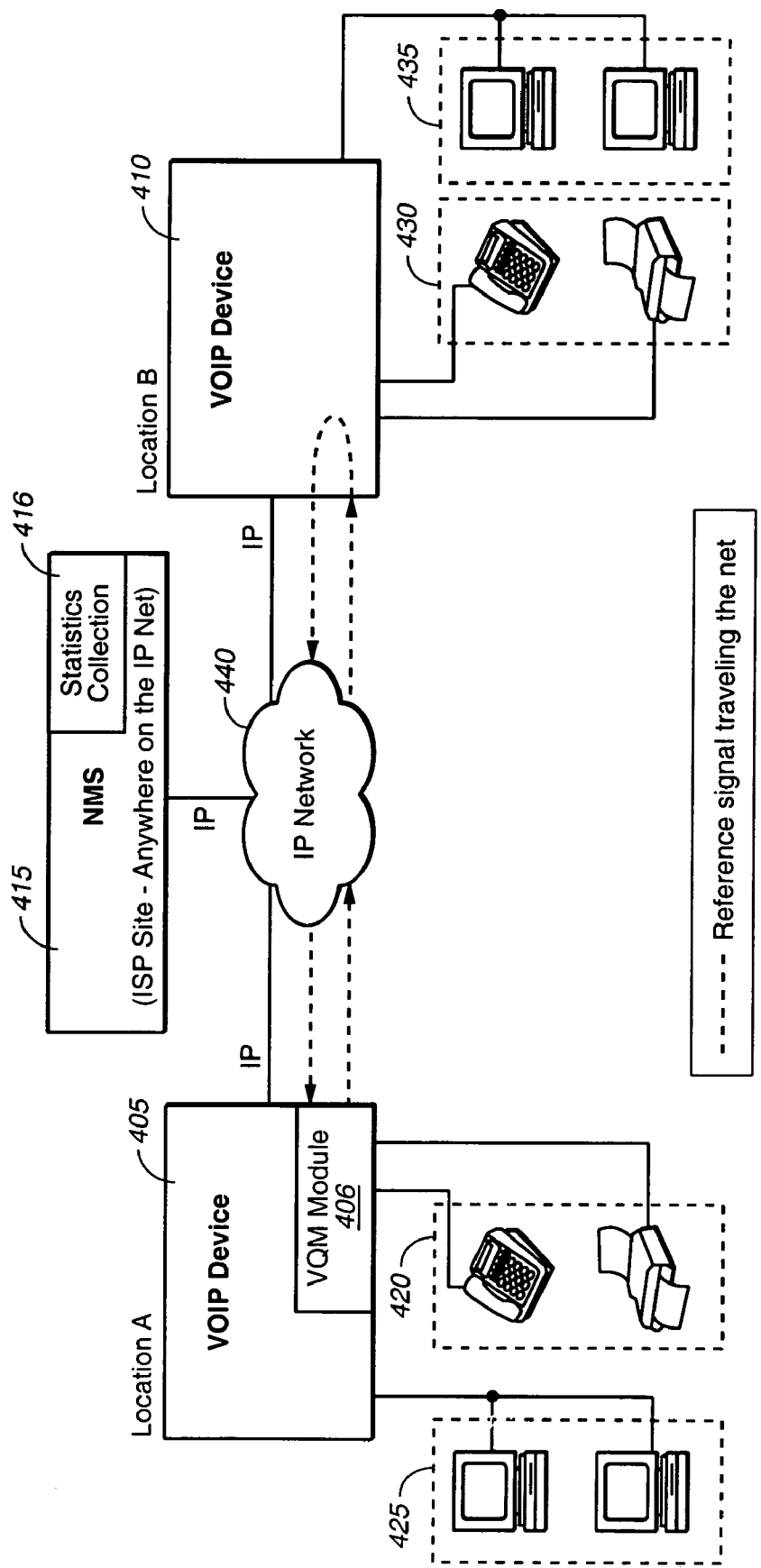
FIG._2b

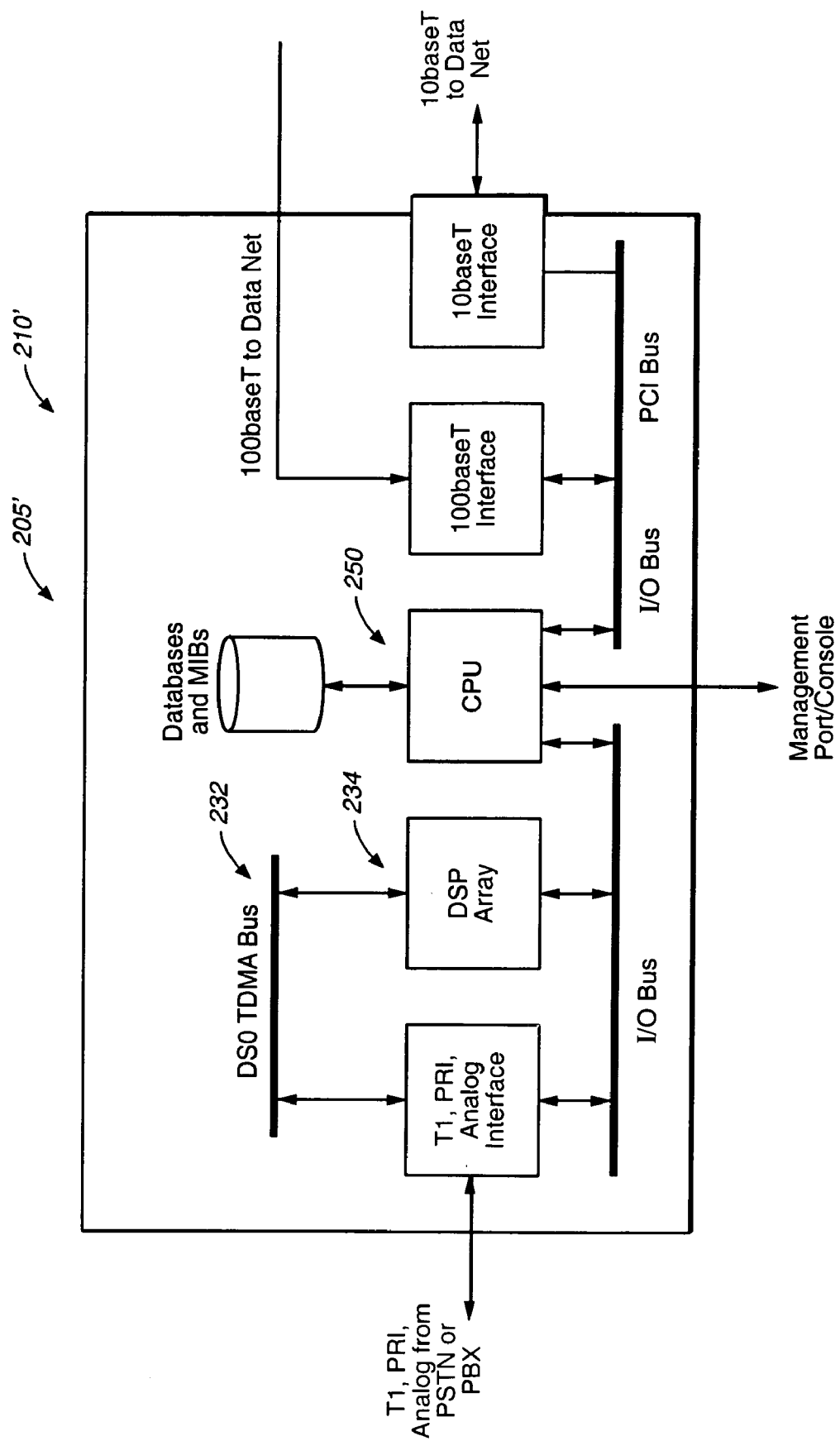
FIG._2c

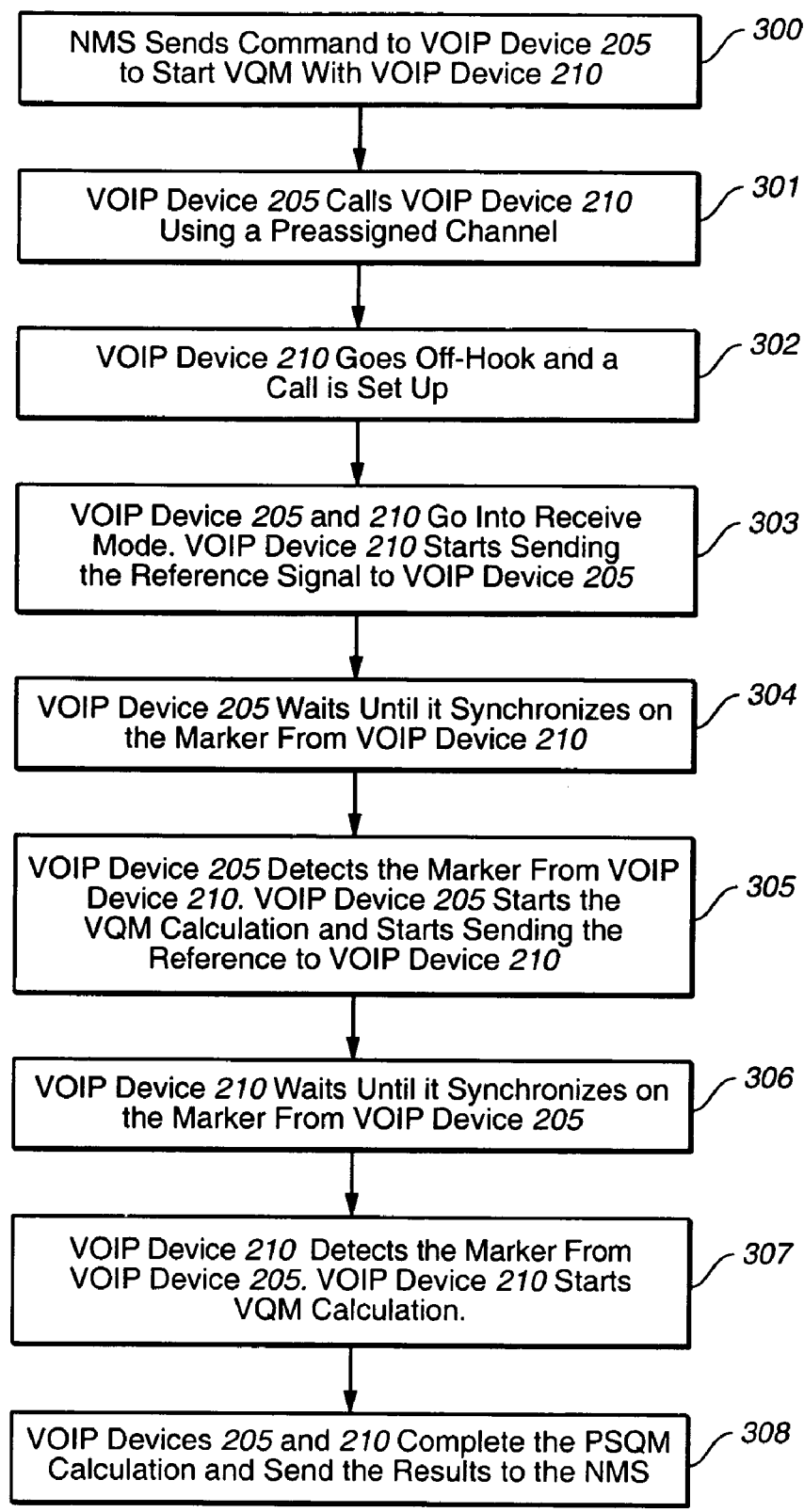
FIG._3

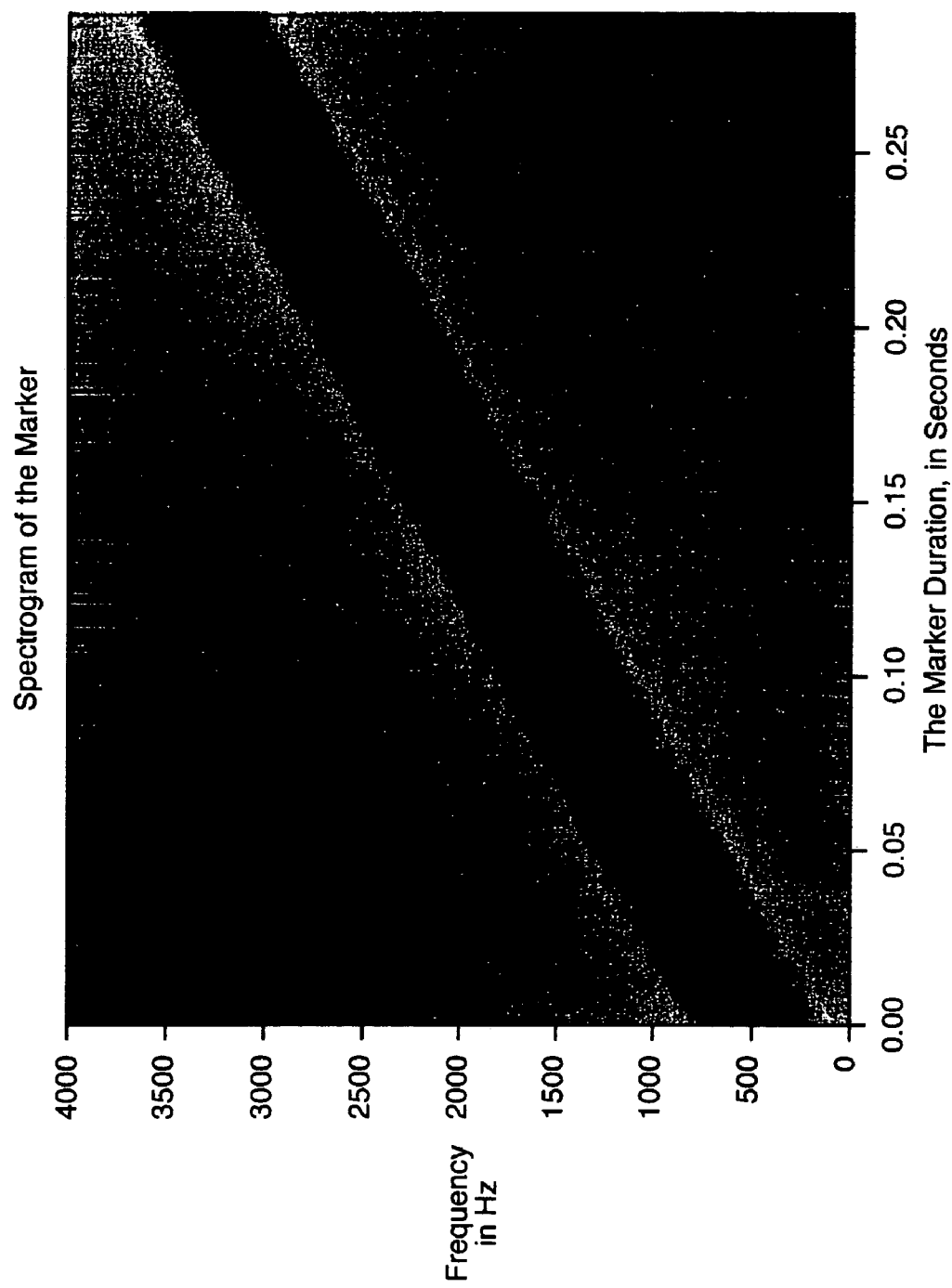
FIG._4a

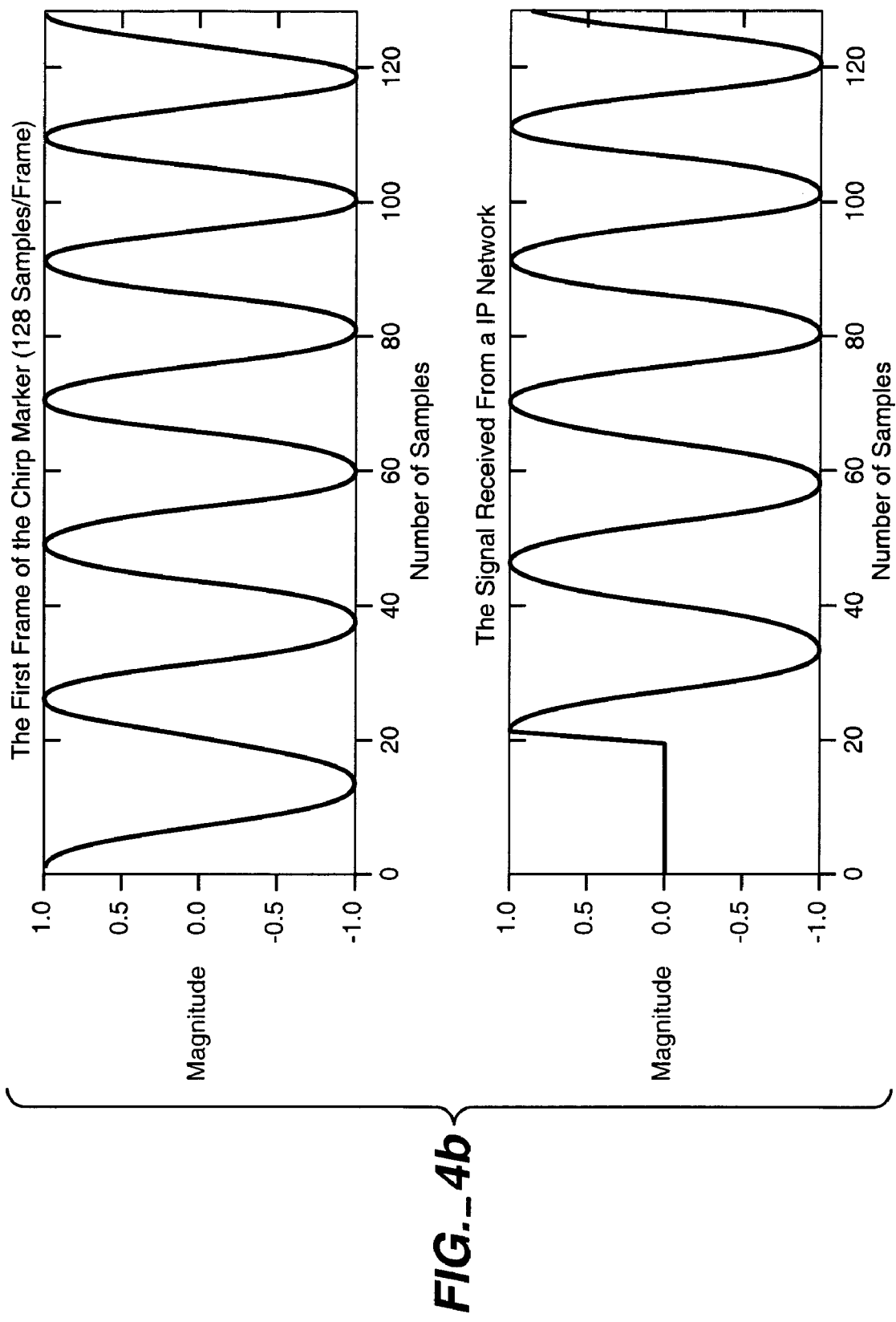
FIG._4b

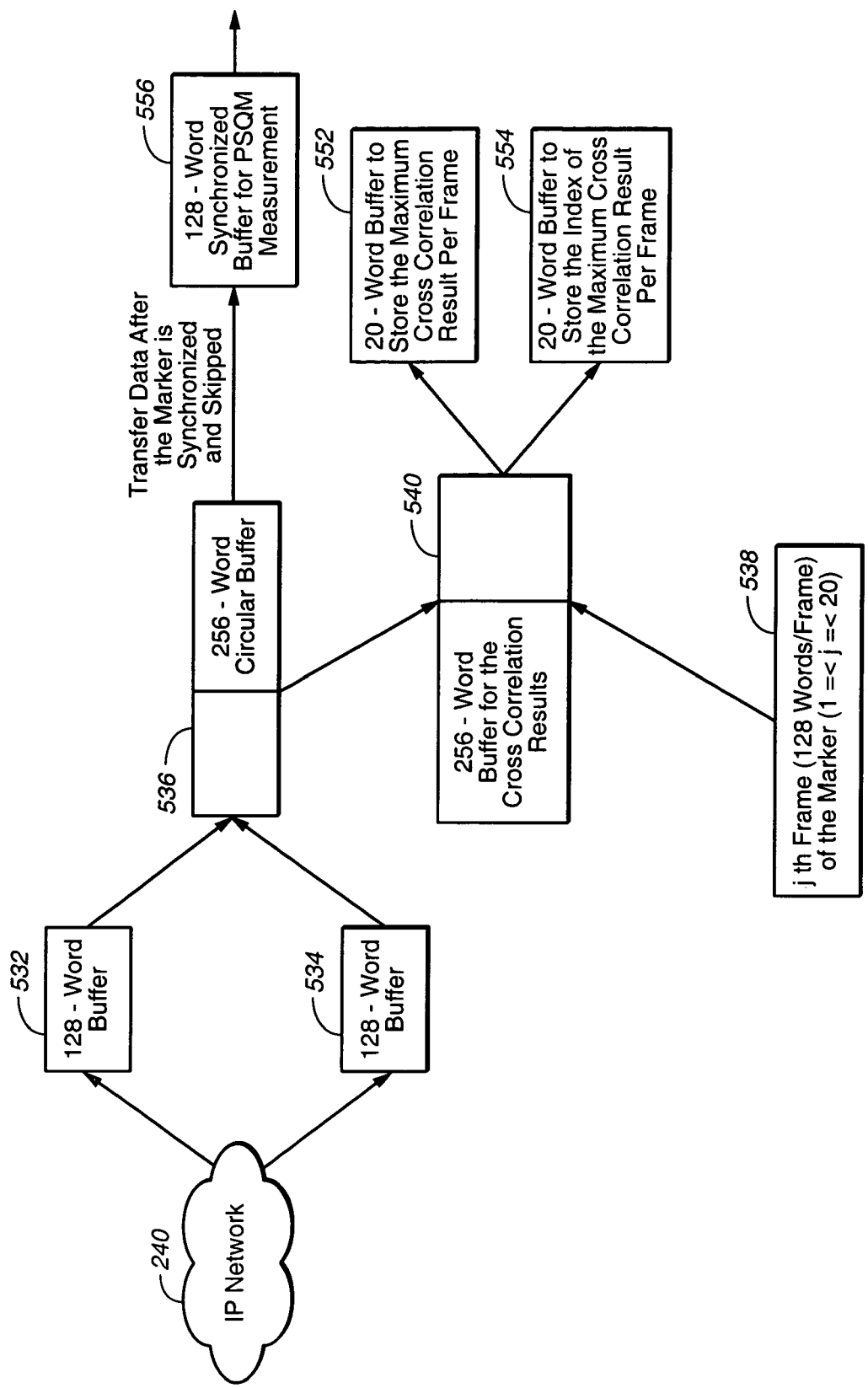
FIG._5

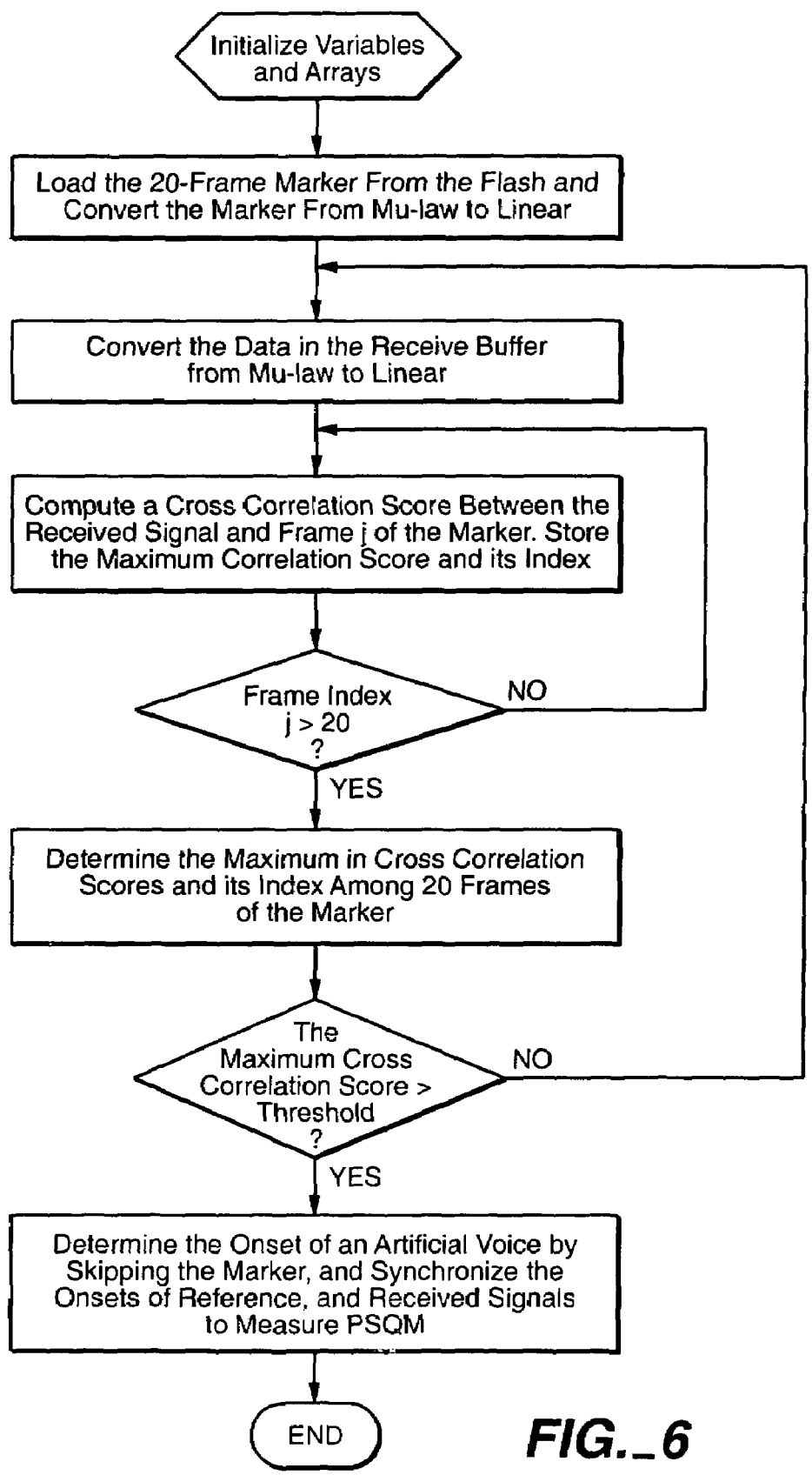
FIG._6

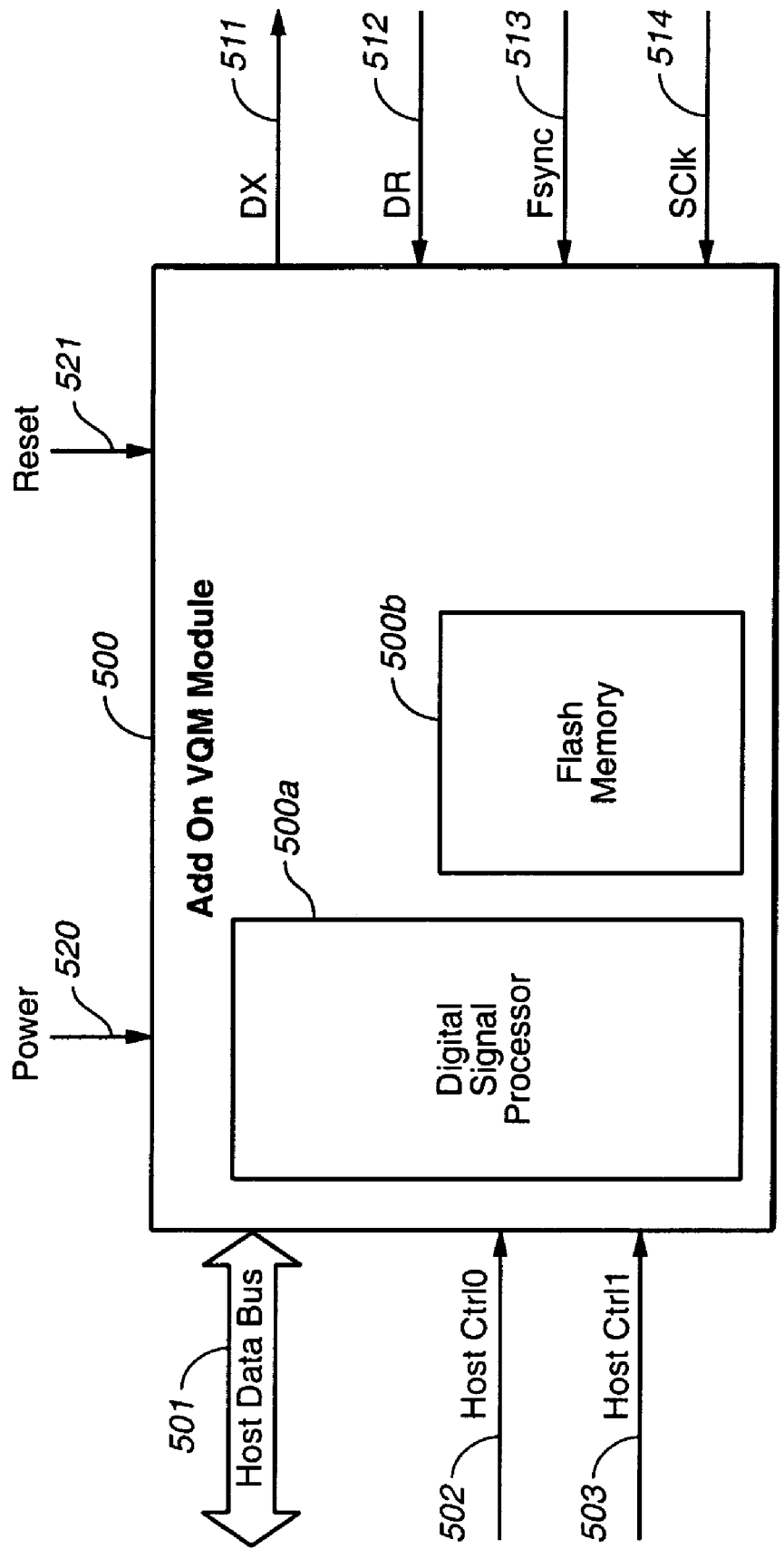
FIG._7

SYSTEM FOR REAL TIME VOICE QUALITY MEASUREMENT IN VOICE OVER PACKET NETWORK

BACKGROUND OF THE INVENTION

The invention relates in general to real-time measuring of voice quality in Voice Over Packet Networks ("VOPN"), and in particular to such measurements by sending voice test signals over Packet networks.

Voice quality can be measured by subjective or by objective methods. International groups carried extensive standardization work on this field. Subjective methods are listening experiments that involve a group of listeners that are presented with voice material. Each individual is asked to rate the speech quality according to a scale from 1 to 5. By averaging the opinion scores a number that reflects the speech quality is obtained. This number is called Mean Opinion Score (MOS) and it is well known for the quality characterization of speech coders. ITU Recommendation P.800 discusses subjective methods and provides with guidelines on how to obtain reliable and reproducible test results. This kind of experiment requires a lot of planning, listening conditions, listening material, selection of an unbiased panel of listeners, etc. Subjective methods are inapplicable to the real time measurement of voice quality.

Objective measurement systems for speech quality measurement use two signals as their input, namely an original signal (reference pattern) and the corresponding output signal after its transition through the network under test. The two signals are compared and an average score reflecting the voice quality is obtained.

The signal processing within objective methods based on the comparison of speech samples can be divided into three major steps: Pre-processing, Psycho-acoustic modeling and Speech Quality estimation model.

The Pre-processing step includes a Delay adjustment to time align properly the two signals and a Loudness adjustment to compensate for differences in power between the reference and transmitted signals.

The Psycho-acoustic model maps the physical signals onto psychophysical representations that match the internal representation of the speech signals. The internal representations make use of psychophysical equivalents of frequency (Bark) and intensity (Compressed Sone).

The Speech Quality estimation model is based on the differences in the internal representation. This difference is used for the calculation of the noise disturbance as a function of time and frequency. This Voice Quality Measurement (VQM) value can be transformed from an objective quality scale to a subjective quality scale. ITU Recommendation P.861 standardizes an objective method called Perceptual Speech Quality Measurement (PSQM). The method is depicted in ITU Recommendation P.861 (1998), "Objective quality measurement of telephone-band and wideband digital codes". Hollier in U.S. Pat. No. 5,621,854 discloses a second method call PAMS. PSQM and PAMS were originally developed to measure the voice quality delivered by different speech coders and not to test live conditions over a transmission channel. Hollier describes a test apparatus that has access to both ends of a telecom apparatus. Hollier assumes that the whole signal can be stored and later made available for quality measurement and does not disclose how the original test signal and the output signal are aligned to perform the measurement. For loudness adjustment Hollier assumes that the whole signal is available. No mention is made of a network carrying voice by means of data packets and the associated problems like packet loss and jitter.

Several factors affect voice quality in Voice over Packet networks: Delay, Jitter, Packet loss and Speech compression. The Pre-processing steps of Time alignment and Loudness adjustment are simple when the complete signals are available for storage and when the processing can be done off line. These tasks become very complicated if they need to be done in real time under network-degraded conditions. Voice quality measurements are extremely sensitive to any misadjustment during the Pre-processing steps. Misadjustments may be caused by erroneous detection of the beginning of the speech test material and also by missing parts of the speech test signal due to packet loss. They also include effects such as time scale modifications introduced by adaptive jitter buffers embedded in the Voice over Packet equipment. Such problems may severely degrade voice quality measurements.

In order to cope with these problems, measurement methods have been proposed. For example, Agilent introduced in 1999 the Telegra Voice Quality Tester that implements PSQM and PAMS, with a price tag in the range of tens of thousand dollars. The implementation is done using a high end Personal Computer with huge amounts of memory to store the signals and a powerful processor (such as Pentium III, from Intel Corporation) to process the voice signals. Although the solution used is expensive, the measurement is not done in real-time. Test signals are first transmitted from one end of the Tester, recorded at the other end and then processed to obtain a voice quality score.

FIG. 1 shows a typical topology necessary to connect the external test equipment to perform a voice quality measurement according to prior art referred to above. Voice over Internet Protocol ("VOIP") device 105 and 110 are Voice and Data routers that allow people in two different locations to communicate over an IP network 115. Telephone sets and fax machines 140 and 155 are connected to the VOIP devices for voice and Fax transmission. Computer terminals 130 and 150 are connected for Data transmission. In order to assess the voice quality perceived at both ends, test equipment must be connected to both ends. As the locations are geographically distant the connection presents a challenge. The equipment is connected to the far end via the PSTN 125 (Public Switched Telephone Network) and in this case is not measuring just the degradations introduced by the IP network but also any degradation introduced by the PSTN. A second possibility would be to connect two test equipment systems, one at each end and try to synchronize the measurements.

The prior art system of FIG. 1 is useful when planning and simulating a network under laboratory conditions where all the equipment is at the same location. In an operating network, the creation of observation reference points for measuring voice quality is a difficult task. One of the main problems network administrators face is the distance separation between observation points because tests that require timing synchronization among distant instruments are complicated.

SUMMARY OF THE INVENTION

Voice over packet products are located at the edges of the packet network and where the packet network connects to the Public Switched Telephone Network (Gateways). They include by definition powerful Digital Signal Processors (DSPs) or other processors to perform Speech Compression, Echo Cancellation and other computational intensive tasks.

These processors are designed to process speech signals and with the proper algorithms can perform the real-time voice quality measurements using minimal memory resources. What is needed is not expensive external equipment but real time measurement capabilities that can be used with the Voice over packet products deployed through the network. Armed with such real time measurement capabilities, these products will perform, under the network administrator control, real-time voice quality measurement between nodes, to assess the Speech Quality delivered to the end users.

Accordingly, it is a general object of the present invention to provide a digital processing method to generate test calls between voice over packet equipment and to measure in real time the voice quality using resources available in this kind of equipment. Furthermore, a methodology is used to perform the pre processing steps of Delay adjustment and Loudness adjustment under severe network degradations, eliminating the need for storing the entire signals and therefore allowing real-time measurement.

As noted above, one important consideration in real time voice quality measurements of networks is that the time synchronization among distant instruments in the network can be complicated. This is solved in the invention by sending timing markers along with the voice test signals across the network to indicate the onset time of the voice test signal. If the same reference marker for indicating the onset times of voice test signals is used at two observation points separated by a distance, the reference marker transmitted from one observation point and received at the other observation point may be compared with a local reference marker to establish timing synchronization. Thus if the marker indicates the onset time of a reference voice test signal sent along with the marker through the network, a comparison of the two markers will yield information on the onset time of the voice test signal sent through the network. If the same reference voice test signal is used at the two observation points, the voice test signal received at the other observation point may be processed together with the reference voice test signal to measure the voice quality of the network. In this manner, the voice test signals are therefore time synchronized between instruments at the two observation points.

The equipment used at one of the observation points is capable of transmitting a reference marker and a reference voice test signal and the equipment at the other observation point is capable of receiving such signals through the network, comparing the marker received through the network with the reference marker to find the onset time of the voice test signal received through the network and processing the received voice test signal and the reference voice test signal using such onset time to measure quality of the network.

Alternatively, equipment at each of the two observation points may be capable of performing both the function of transmitting the marker and voice test signal and the function of receiving such signals in order to determine the onset time of the voice test signal received and processing the voice test signals to measure the quality of the network. As still another alternative, the equipment at one observation point may be capable of performing both functions as described above, with the equipment at the other observation point simply receiving the marker and voice test signal transmitted through the network and returning such signals through the network to the equipment at the other observation point, where such signals originated. The three tasks of receiving the marker and voice test signal transmitted through the network, comparing the marker received with the reference marker to find the onset time, and processing the two voice test signals may be performed by a single component of the equipment, or by separate components of the equipment.

The marker may be divided into separate portions contained in different packets. One portion, or a plurality of portions together, of the marker may contain adequate information to indicate the onset time of the accompanying voice test signal. Therefore, as long as such one or more portions of the marker have been received, such portion(s) may be compared with one or more portions of the reference marker to identify the onset time of the voice test signal received through the network. In one embodiment, the marker includes a signal having a frequency that changes continuously with time, where receipt of a single portion of the marker (or only a part of such portion) may be adequate to identify the onset time of the accompanying voice test signal.

As noted above, another commonly encountered problem in real time voice quality measurements is that packets transmitted through the network undergo various processes that adjust the loudness of the voice data. Such gain scaling is taken into account by normalizing the voice test signal received. In conventional voice quality devices described above, the user has to wait until the entire voice test signal has been received before the loudness adjustment is made. In real-time measurements, however, the entire signal may not be available. In such event loudness adjustments in conventional systems becomes difficult.

According to the invention, the voice test signal transmitted through the network is divided into portions. At least some of the packets contains one or more of the portions of the voice test signal. The invention does not require receipt of all of the portions of the voice test signal before loudness adjustment can be made. Instead, after one or more portions of the voice test signal is received through the network, such received portion(s) may be processed together with one or more portions of the reference voice test signal, so that information concerning quality of the network becomes available after receipt of packet(s) containing said portion(s) and before receipt of packets containing all of the portions of the voice test signal through the network.

The equipment at least one of the observation points of the network with voice quality testing capability may contain a central processing unit (CPU), a bus carrying voice data and a voice quality module in communication with the CPU and the bus. The module comprises a processor that provides a reference voice test signal to the bus for transmission to another device through the network, or that processes a voice test signal received through the network and a reference voice test signal to test the quality of the network. If the processor provides a reference voice test signal to the bus for transmission to another device, the equipment can then perform the function of transmitting the voice test signal through the network to another observation point, where the processor processes the voice test signal received through the network. The equipment then processes the two voice test signals to measure the quality of the network. It is possible of course for the processor to have the capability to perform both functions.

The voice quality module including the processor may form an integral part of a Voice Over Packet Network ("VPON") device. In such event, the module forms an integrated device with the CPU and the bus carrying voice data of the voice over packet network device. Alternatively, the voice quality module may form a separate unit and is connected to the voice over packet network device as a plug-in unit through externally accessible pins or connectors, or may form a component that can be inserted (such as a printed circuit card) into the container for the voice over packet network device. The voice over packet network device may be a voice over IP device, a voice over ATM (Asynchronous Transfer Mode) or DSL (Digital Subscriber Loop) device or a Voice Over Frame Relay (VOFR) device.

BRIEF DESCRIPTION OF THE DRAWINGS

FIG. 1 is a block diagram depicting prior art external voice quality test equipment FIG. 2a is a block diagram of a network connecting two VOIP devices each including a voice quality module (VQM) for measuring voice quality of the network according to a first embodiment of the present invention.

FIG. 2b is a block diagram of a network connecting two VOIP devices where one of the VOIP devices includes a voice quality module (VQM) for measuring voice quality of the network according to a second embodiment of the present invention.

FIG. 2c is a block diagram depicting a voice over IP device useful for illustrating the invention.

FIG. 3 is a flowchart that illustrates from the Network Management System (NMS) perspective the process of generating a Voice Quality Measurement between 2 VOIP devices to illustrate the invention.

FIG. 4a illustrates a timing marker used for synchronization in the frequency domain.

FIG. 4b illustrates a transmitted marker and its relative position to the original signal.

FIG. 5 is a functional block diagram illustrating the buffers in the VQM involved in the process of estimating the Delay adjustment to illustrate an embodiment of the invention.

FIG. 6 is a flowchart depicting the processing steps to time align the 2 marker signals to illustrate an embodiment of the invention.

FIG. 7 is a functional block diagram illustrating the VQM as an add-on module.

For simplicity in description, identical components are labeled by the same numerals in this application.

DETAILED DESCRIPTION OF THE PREFERRED EMBODIMENT

FIG. 2a shows a connection between several company branches via an IP network 240. This illustrates a converged voice and data network in which employees at any branch can transfer data (PC attached to LAN 225) and also send faxes or carry phone (Telephones or PBX 220) conversations with their colleagues at the same branch and/or those at a different one. A Service Provider company provides with the business network services (data and voice). This company must guarantee some pre agreed Quality of Service in terms of bandwidth and voice quality to its customers. Block 215 represents a Network Management System (NMS) which is a computer system used to configure, provision services and monitor the connected network devices.

According to the invention the NMS 215 is used to trigger the voice quality measurements between the VoIP devices 205, 210 and collect statistics on the voice quality delivered. The Service Provider company uses these statistics 416 to study trends and trigger alarms in case the quality drops below pre-established levels.

The VoIP devices include the software and hardware necessary to perform the speech compression, encapsulation and signaling necessary to transport voice over packet networks. In addition, Voice Quality Measurement (VQM) modules 206, 211 are included to implement the methods depicted in the invention. Each of the modules includes a Digital Signal Processor 206a, 211a, such as the TMS320C54xx series manufactured by Texas Instruments, Inc (Dallas, Tex.) and a Flash memory 206b, 211b, such as the 28F800C3 manufactured by Intel Corporation (Santa Clara, Calif.) to store a copy of the marker used for synchronization and algorithm tables.

Under the control of the Network Management System, Device 205 at location or observation point A of the network will call Device 210 at location or observation point B of the network, and will request to enter the VQM mode. Once the request is granted both devices will send the Reference Signal in their transmitter channel and the Voice Quality measurement will be performed at the opposite box in its receiver channel. The test is performed as a "dummy" phone call in which no person is involved. Instead of a person talking the VQM module will playback a stored voice signal or alternatively will generate an artificial voice according to ITU Recommendations P.50 (1993), "Artificial Voices," and instead of a person listening the VQM module will perform the quality measurement. The measurement includes the time alignment and loudness adjustment steps according to the invention as described below and the psycho acoustic modeling according to one of the standard methods like the PSQM depicted in ITU Recommendation P.861 referred to above.

The artificial voices or another type of voice test signals used for measurement are transmitted after a marker signal used for synchronization. The purpose of the marker is to correctly perform the time alignment of the signals. The marker is transmitted along with the voice test signal, where the marker indicates the onset time of the voice test signal. The combination of marker and voice test signal is called the reference signal and substantially identical copies of the reference signal are preferably kept at each VQM module at each location or observation point of the network. The reference signal is transmitted via a packet network and is received by the measuring end and it is called the transmitted signal, which includes the transmitted marker and transmitted voice test signal.

Referring to the flowchart in FIG. 3, the process of performing the Voice Quality Measurement will now be described.

In the first step 300, the NMS sends a command to VOIP device 205 to perform a VQM test with VOIP device 210.

In the second step 301, VOIP device 205 calls VOIP device 210, using a preassigned channel that is not used for regular call purposes.

In the next step 302, VOIP device 210 goes "off hook" and a call is set up between VOIP device 205 and VOIP device 210. The "off hook" is figurative; no one is actually lifting a handset as the call setup is performed along preassigned channels automatically without human intervention. How such fake phone call is accomplished by device 205 or 210 is known to those in the art and will not be described here in detail.

In the next step 303, both VOIP devices 205 and 210 go into the receive mode in the preassigned channel, and VOIP device 210 also start transmission of the reference signal to VOIP device 205 in the preassigned channel.

In the next step 304, VOIP device 205 waits in the receive mode attempting to detect the marker embedded at the beginning of the reference signal sent from VOIP device 210.

In the next step 305, VOIP device 205 detects the marker sent from VOIP device 210, performs the time alignment between the reference signal and the transmitted signal and starts the voice quality calculation. VOIP device 205 also concludes that VOIP device 210 is already in the receive mode, so VOIP device 205 starts to transmit the reference signal to VOIP device 210.

In the next step 306, VOIP device 210 attempts to detect the marker embedded at the beginning of the reference signal sent from VOIP device 205.

In the next step 307, VOIP device 210 detects the marker signal sent from VOIP device 205, performs the time alignment between the reference signal and the transmitted signal and then starts the voice quality calculation.

In the next step 308, VOIP devices 205 and 210 complete the VOICE QUALITY calculations and send the results to the NMS for statistics collection. The test call is tore down.

The test mode described in FIG. 2*a* is a "Two-Way mode". In this case two devices, each equipped with a VQM module, send and receive the reference signal and calculate the VQM score. Thus, in the above process, both devices 205 and 210 are able to transmit the reference signal and to receive and process the received reference signal and the stored reference signal to perform the voice quality calculation in a two-way mode. This is not required. In a "non-Two Way" mode, only one of the two devices 205 and 210 needs to be able to transmit the reference signal and the remaining device needs to be able to receive and process the received reference signal and the stored reference signal to perform the voice quality calculation. Such and other variations are within the scope of the invention.

Loop Back Mode

Yet another alternative mode is described in FIG. 2*b*. In this mode only device 405 at location A includes a VQM module. Device 410 at location B does not include a VQM module. Only device A will send the reference signal, calculate the VQM score and send it to the NMS.

Under the Network Management System (NMS) 415 control, device 405, that includes a VQM module, will call a special telephone number in device 410. Receiving a call to this special number will tell device 410 that a VQM session is to be started. When the call is set up, device 405 will start sending the reference signal to the network. It will, also, wait for the returned reference signal in its receive channel.

Device 410 will just loop the packets it receives from device 405 back into its transmit channel, thus sending them back to device 405.

Device 405 will wait for the marker, synchronize, perform the VQM test and send the results to the NMS in a way similar to that used in the Two-Way mode.

Add-On Mode of the VQM Module

The VQM module 206 of FIG. 2*a* does not have to be embedded in a Voice Over Packet equipment. It can also be implemented as a separate module that can be added to existing Voice Over Packet equipment.

FIG. 7 describes one embodiment of a VQM add-on module. The VQM add-on module 500 includes a Digital Signal Processor 500*a* and a Flash Memory 500*b*.) Module 500 interfaces with a Main processor eight-bit Host Data Bus 501 and two control lines 502, 503. Bus 501 serves as both the address and data bus, and signals on control lines 502, 503 indicate whether the signal on the bus is for address or data. The module also includes a serial port to exchange voice samples with the VOIP Device. The port includes the following lines: serial data transmit port output 511, serial data receive port input 512, Frame Sync signal input 513 and Shift Clock signal input 514, that allow to interface to a Time Domain Multiplexing (TDM) bus, for voice data transfer.

It also includes a connection for power input 520 needed to operate the module and a reset input 521 needed to reset the module.

The host can send command messages to the module and receive status messages from the module by using the Data Bus 501.

The command messages that the host can send to the VQM module are:
 a) "Initialize VQM", that tells the module to prepare for the VQM mode.
 b) "Do VQM", that tells the module to start the VQM test.

The status messages that the module can send to the host are:
 a) "VQM Module Ready", that tells the host that the module is ready to start the VQM test.
 b) "VQM Result" that sends the calculated VQM value to the host.

FIG. 2*c* is a block diagram depicting a voice over IP devices 205', 210' without the VQM modules 206, 211, useful for illustrating the invention. Referring to FIG. 2*c*, by connecting the lines 511, 512, 513, 514 of Add-On Module 500 to the DS0 TDM bus 232 the module replaces a caller connected to this bus via the T1/PRI/analog interface. Instead of a person talking, the module 500 generates the test voice signal and instead of a person listening, the module receives the transmitted voice signals and measures ("listen") the perceived voice quality.

It should be noticed that in this case the module generates, receives and measures the voice signals. The DSP array 234 and the CPU 250 in FIG. 2*c* perform the compression, encapsulation and signaling protocols necessary for voice over packet transmission. The host data bus 501 and control lines 502, 503 connect the module 500 to CPU 250. Thus, aside from the reset terminal 521, module 500 may be connected to existing bus or connections available in VOIP devices. Therefore, it would be a simple matter for existing VOIP devices to be modified so that the Add-On Module 500 can be added, either as an external unit connected to complementary external pins or connectors of the VOIP devices, or as a printed circuit card with connections or traces thereon connected to internal complementary pins or connectors of the VOIP devices and fit within the same containers for the VOIP devices.

To add the functionality of the module 500 to existing VOIP devices, software for selecting the preassigned channel for the voice quality tests and for cooperating with the module may be added and installed to CPU 250. Such software and installation are believed to be evident to those skilled in the art in view of this disclosure, so that no detailed description thereof is necessary. Where modules 206, 211 are embedded in devices 205, 210, the modules have structures similar to module 500, and their functionalities may be integrated with the host devices either as integrated chips mounted on the same boards as those used for devices 205, 210, or as parts of integrated chips where all of the functions of devices 205, 210 are integrated in the same chips.

In a different embodiment the connection to the TDM bus can be eliminated if the Add-On Module includes means for compression and encapsulation. In this case the module will be connected just to the CPU via a Data bus (I/O bus). The module will encapsulate the Reference signal (marker+voice test signal) into packets and transfer them to the CPU that will be responsible for transmitting them over the packet network, for example, via a 10baseT interface. The receiving module will receive the packets from the CPU, will de-encapsulate them one by one, reconstruct the marker samples and once synchronization is achieved it will perform the Voice Quality measurement on the incoming packets containing the transmitted voice signal.

Time Alignment

The accuracy of objective voice quality algorithms is largely determined by the time alignment of a reference signal and the signal received after being transmitted via a transmission network (transmitted signal). In order to provide an accurate estimate of the voice quality, the invention discloses a synchronization algorithm developed to cope with degradations common to networks environments in which packet loss, jitter, delay and compression affect the signals in such way that synchronization with the reference signal becomes extremely difficult.

The synchronization algorithm is based on a marker of N samples, N being a positive integer, of a chirp signal defined by equation (1) below. The digital signal processor (or other types of processors) of a VQM module, such as one of modules 206, 211, 500, is operated at a sampling frequency F, wherein said processor provides a reference marker that has N samples and that is a signal y given by:

$$y = \cos\left(2\pi\left(f_0 + \frac{(f_1 - f_0)t}{T_1}\right)t\right) \quad [1]$$

where
$f_0$=Onset frequency;
$f_1$=Offset frequency;
$T_1$=(N−1)/F; and
t=t+1/F, and $0 \leq t \leq T_1$.

In the preferred embodiment, N is equal to 2560, and the 2560 samples preferably are grouped into 20 frames (128 samples/frame), and F is 8,000 Hz. The frequencies $f_0$ and $f_1$ are selected according to the desired direction of the frequency sweep. Typical values for an ascending sweep are $f_0$=350 Hz and $f_1$=3500 Hz. The advantage of using a chirp signal such as the one in equation [1] is that each frame or a portion thereof contains information that uniquely identifies the onset time of the voice test signal associated with it and can be used to uniquely identify any instance in time where there is maximum identity between a small portion of a reference signal of such form and the same portion of the signal transmitted over a lossy medium. Thus even if only one out of the 20 frames of such signal is correctly transmitted through the network, it would still be possible to measure the timing offset between the transmitted portion and the reference portion. This may be possible even where not all 128 samples of such frame are received correctly. The relative timing where there is maximum identity between a portion of the transmitted marker and a portion of the reference marker is indicated by a maximum cross-correlation score of the two portions. While an upward or downward sweeping chirp signal in the form of equation [1] may be preferred, any signal whose frequency varies continuously with time may be used to avail oneself of all of the above-described advantages and is within the scope of the invention.

One function of the marker is to permit synchronization of the transmitted voice test signal and the reference voice test signal before the entire voice test signal is received. For this purpose the marker is preferably not of a long duration, such as one that is not more than 5 seconds.

The spectrogram in FIG. 4a illustrates the frequency content of the marker signal as a function of time. The marker is stored in a flash memory of a VQM module, such as one of VQM modules 206, 211, 500, in a µ-law format and sent out to the IP network followed by an artificial or natural male or female voice for the end-to-end voice quality measurements. The chirp marker and the signal received from the IP network usually misalign, which is illustrated in FIG. 4b with a 128-word buffer. For more information on µt-law format, the reader is referred to ITU Recommendation G.711 (1988), "Pulse Code Modulation (PCM) of Voice Frequencies". In order to correctly time align the signals the following procedure is performed. Note that due to packet loss in the network, part of the marker can be missing. At the receiving end, the data from the IP network is first de-encapsulated and then transformed into samples which are arranged in buffers shown in FIG. 5.

FIG. 5 is a functional block diagram illustrating the buffers involved in the processor of a VQM module, such as one of the VQM modules 206, 211, 500, in the process of estimating the Delay adjustment. According to the preferred embodiment of the invention, each of the 20 frames of the marker includes 128 samples. One or multiple frames of the marker are encapsulated in a data packet and sent through the network 240 as described above and received alternately by one of the two 128-word buffers 532, 534. The number of samples per buffer is selected as a power of two due to the fact that voice quality measurement algorithms normally use Fast Fourier Transforms (FFT) to build the psycho-acoustic modeling.

Referring to FIG. 5, the samples in the received frame are converted from a µ-law to a linear format, scaled down by 128, and transferred to a 256-word circular buffer 536. The most recent frame of data in this buffer is used to calculate a cross-correlation with each frame 538 of the reference marker, where such reference marker is retrieved from Flash memory, converted from a µ-law to a linear format, and scaled down by 128. The scale downs of the marker and the received signal are adopted to avoid an overflow in cross-correlation score per frame. The cross-correlation calculation is a known procedure in the field of Digital Signal Processing, described for example in Rabiner, L. R. and Gold, B. "Theory and Application of Digital Signal Processing", Prentice-Hall, Inc., Englewood Cliffs, N.J., 1975.

Since each 128-sample frame received can be positioned at up to 128 different positions relative to each frame in the reference marker, a 256-word circular buffer 536 is used in the cross-correlation process with each frame in the reference marker. In such way the same number of samples, in this case 128, is used in the computation of each cross-correlation value. The cross-correlation scores per frame are temporarily stored in a 256-word buffer 540, and then a maximum cross-correlation score per frame and its corresponding index, which is defined as an exact location within the buffer 540 for the maximum score, are extracted and stored in two 20-word buffers 552, 554, respectively.

After cross-correlation of the currently received frame through the network with the jth frame of the reference marker is completed, the process is repeated with other frames in the reference marker. In other words, the process is repeated by incrementing j by 1 each time, until all of the 20 frames in the reference marker have been similarly processed. When the computation for the last frame of the marker is done, an ultimate maximum cross-correlation score and its frame index, which is defined as a frame number corresponding to the highest cross-correlation score among the 20 frames of the marker, are retrieved and used to compare with an empirical threshold in the range of 30–60 for speech compression codecs such as G.711 or G.729. The frame index identifies the particular frame of the marker that has been received. For more details on such codecs, please see ITU Recommendation G.711 (1988), "Pulse Code Modulation (PCM) of Voice Frequencies" and ITU Recommendation G.729 (1996), "Coding of speech at 8 kbit/s using conjugate-structure algebraic-code-excited linear prediction (CS-ACELP)".

The threshold is chosen based upon factors such as the frame length, similarity and magnitudes of the signal received and the marker. If the maximum cross-correlation score exceeds the threshold for a codec, the frame index and the index corresponding to the maximum cross-correlation score in buffer 540 are used to determine which frame of the marker is present, and where the marker is located in the receive buffer, respectively. The onset and offset of the marker can then be determined; the subsequent frames of the marker are skipped, and the timing offset of the received and reference markers is used to synchronize the transmitted voice signal with the reference signal stored in the flash memory.

It is important to note that, when the chirp marker signal in equation [1] is used, and when at least one of the 20 frames is received and cross-correlated with the frames in the reference marker, it is possible to find the timing offset between the two markers. As noted above, there is a known timing relationship between each marker and its associated voice test signal that forms together with it a reference signal. After this timing offset is found, it is then possible to find the onset time of the voice test signal associated with the received marker, since the onset time of the reference voice test signal associated with the reference marker is known. In other words, from a single received frame or a portion thereof, it is possible to find the onset time of the received voice test signal that follows the received marker. While this may be preferable, it will be understood that it is possible to employ markers where more than one frame are to be received before the onset time of the associated voice test signal is found; such and other variations are within the scope of the invention. Nevertheless, it is possible to find the onset time of the associated received voice test signal by comparing the two markers, before receipt of all frames in the transmitted marker. The embodiment can also be modified so that the marker is divided into uneven frames containing an unequal number of samples.

If the cross-correlation score fails to surpass the threshold for a codec, then the above described synchronization algorithm continues to search for the presence of the marker in the next frame of the data using the method described above. The flowchart to synchronize the transmitted signal from the IP network and the reference signal is illustrated in FIG. 6. Such algorithm is performed by the processor (preferably a digital signal processor) of a VQM module, such as one of modules 206, 211, 500. The software for such algorithm is preferably stored in memory of the VOIP devices 205, 210, and is retrieved upon initialization of the VQM module and sent to the processor in the module, for carrying out the steps of the algorithm. Alternatively, it may be stored in the flash memory in the module.

In reality, a synchronization algorithm must be robust since the transmitted marker that is received from an IP network experiences packet loss, jitter, delay, etc. If the packet loss from the IP network is assumed to be independent and randomly distributed, the present algorithm should perform solidly until the percentage of the packet loss goes up to 95%, 90% or 86% supposing that one frame, two frames, or three frames of the marker are packed into one packet, respectively, and only one packet reaches the destination. Test results consistently showed that the present synchronization algorithm performed extremely well under network conditions ranging from excellent to poor conditions as defined in Telecommunications and Internet Protocol Harmonization Over Networks (TIPHON); General aspects of Quality of Service (QoS), pp. 24–27, TR 101 329 V1.2.5 (1998-10), ETSI. Finally, for those skilled in the art it is clear that the accuracy of this algorithm could be further improved by means of lengthening the marker, optimizing the empirical threshold, or examining multiple frames of the marker whose cross-correlation scores rank among the highest instead of using one with the highest score.

The above-described algorithm is implemented in software that is illustrated in more detail in Appendix A attached hereto and made a part of this patent application.

Gain Scaling

In order to properly measure voice quality the signal that undergoes network transmission must be compensated for the overall gain of the system. Gateways include Automatic Level Control units that may change the level of the signal; therefore before the reference signal is compared with the transmitted signal, a global scaling must be performed for level adjustment. Voice quality measurement methods described in P.861 referred to above generally assume that the whole signals are known in advance and stored in memory before performing the measurement. In such cases the signals are known from start to end and can be normalized by computing the a global scale factor according to equation set forth in ITU Recommendation P.861 (1998), "Objective quality measurement of telephone-band and wideband digital codes":

$$Sglobal = \sqrt{\frac{\sum_{start}^{end} x[m]*x[m]}{\sum_{start}^{end} y[m]*y[m]}} \quad [2]$$

where x[m] represents the reference signal and y[m] represents the transmitted signal In practical situations this is not the case and therefore this gain scaling step must be performed in real time. According to the preferred embodiment the gain scaling factor is initially estimated using the power of the reference and transmitted marker signals and afterwards running an exponential averager on the power of the voice test signal and the transmitted voice signal.

The initial power estimates for the reference and transmitted signals are calculated, once the synchronization is established, using the following formulae:

$$Pt(0) = \frac{1}{(N - n_0 + 1)} \sum_{n=n0}^{N} Pmt(n) \quad [3a]$$

Where:

Pmt(n) indicates the power of frame "n" in the transmitted marker n0 indicates the frame at which the maximum cross-correlation was found in the time alignment routine
N is the number of frames in the marker
Pmt(n) is computed according to $$Pmt(n) = \sum_{i=1}^{128} mt(i) * mt(i) \quad [3b]$$

where:
mt(i) indicates the sample "i" in the corresponding frame of the transmitted marker
For the reference marker similar equations are used $$Pr(0) = \frac{1}{(N - n_0 + 1)} \sum_{n=n0}^{N} Pmr(n) \quad [3c]$$

Where:
Pmr(n) indicates the power of frame "n" in the reference marker
n0 indicates the frame at which the maximum cross-correlation was found in the time alignment routine
N is the number of frames in the marker
Pmr(n) is computed according to $$Pmr(n) = \sum_{i=1}^{128} mr(i) * mr(i) \quad [3d]$$

where:
mr(i) indicates the sample "i" in the corresponding frame of the reference marker The averager is implemented, using equations [4], in the processor in a VQM module, such as VQM modules 206, 211, 500. This is a predictor controlled by the parameter "α" where "α" is the weight given to past history.

$$Pt(n) = \alpha \times Pt(n-1) + (1-\alpha) \times Pt\_frame \text{ for } n=1 \rightarrow N \quad [4]$$

$$Pr(n) = \alpha \times Pr(n-1) + (1-\alpha) \times Pr\_frame \text{ for } n=1 \rightarrow N \quad [4]$$

Where:
Pt(n)=Power estimate of the transmitted signal at time n
Pt(n−1)=Power estimate of the transmitted signal at time n−1
Pt_frame Power of the current transmitted frame computed according to equation [5a]
Pr(n)=Power estimate of the reference signal at time n
Pr(n−1)=Power estimate of the reference signal at time n−1
Pr_frame Power of the current reference frame computed according to equation [5b]
α=Weighting factor
n=frame number
N=total number of frames in the reference signal The initial condition for equations [4] is Pt(0) and Pr(0) which are calculated according to equations [3].

One of the problems with this averager is in the choice of the value of α. In this application the weighting factor α is chosen so the convergence rate of the estimator is 2 seconds. Assuming the frame rate is 1/16 msec that corresponds to α=0.992.

The power of the current frame is calculated as follows:

$$Pt\_frame = \sum_{i=1}^{128} y(i) * y(i) \quad [5a]$$

$$Pr\_frame = \sum_{i=1}^{128} x(i) * x(i) \quad [5b]$$

Where:
y(i) represent the transmitted signal sampled at 8 Khz
x(i) represent the reference signal sampled at 8 Khz The normalization factor is computed using equations [4] as $$S(n) = \sqrt{\frac{Pr(n)}{Pt(n)}} \quad [6]$$

Where:
S(n) is the normalization factor for frame "n"
Pt(n) is the value for the estimated power of the transmitted signal at time "n"
Pr(n) is the value for the estimated power of the reference signal at time "n". Pt(n) and Pr(n) are computed using equations [4]

Before any psycho-acoustic processing the transmitted frame "n" is normalized using the following equation:

$$y'(i) = S(n) * y(i) \text{ for } i = 1 \rightarrow 128 \quad [7]$$

Where:
y' is the normalized transmitted signal
y is the transmitted signal before normalization
S(n) is the normalization factor for frame "n"

As in the case of the transmission of the marker, the voice test signal is also divided into frames of samples, with one or more frames encapsulated in a data packet, where the packets are then transmitted through the network in the same manner as described above for the marker. For example, the voice test signal may also be divided into frames of 128 samples each, although the voice test signal may also be divided into frames containing different numbers of samples. After each data packet is received, it is de-encapsulated to retrieve the one or more frames therein and each frame in the packet received is then processed together with the reference voice test signal stored in the VQM module 206, 211 and 500 for measuring quality of the network. The processing of less than all of the frames of the voice test signal transmitted through the network together with the reference voice test signal may be adequate to yield useful information on the voice quality of the network. Thus, information concerning the voice quality becomes available after receipt of packet(s) containing portion(s) and before receipt of packets containing all of the portions of transmitted voice test signal.

In the event that the processing of a single frame of the received voice test signal through the network and of the reference voice test signal is adequate to yield useful information on the voice quality of the network, such information becomes available even after the receipt of just a single transmitted frame through the network. Therefore, unlike conventional voice quality systems, not the entire voice test signal needs to be available in order for the system of this invention to yield useful information on the voice quality of the network.

As noted above, in conventional systems, gain scaling or normalization is performed only after the entire voice test signal becomes available. This is again unnecessary when the present invention is used. After each frame is received, it may be normalized before it is processed to yield voice quality information of the network by using the above-described normalization factor S(n) in equations [6] and [7] above. After each frame is normalized, it is then processed by a processor 250 in a VQM module, such as modules 206, 211 and 500, to yield network voice quality information. By normalizing each frame upon its receipt, it is therefore possible to adjust the gain prior to the voice quality calculation. This makes possible the finding of voice quality information before receipt of all the frames in the voice test signal. After the time alignment and this normalization step the psycho-acoustic modeling depicted in P.861 can be used in real time for the voice quality measurement.

Some of the buffers in FIG. 5 may be used for processing the voice test signal. Since the voice test signal is also divided into frames of 128 samples each, each frame received may be stored alternately in the buffers 532, 534. The onset time of the voice test signal is found as described above using the associated marker. The frame of the voice test signal from buffer 532 or 534 is transferred to buffer 536 and is shifted to fit the onset time found. It is then transferred to buffer 556 for voice quality calculation, such as PSQM, by processor 250 of the VQM.

While the invention has been described above by reference to various embodiments, it will be understood that changes and modifications may be made without departing from the scope of the invention, which is to be defined only by the appended claims and their equivalent. All references referred to herein are incorporated by reference in their entireties.

APPENDIX A

```
function [Status, FramesSkip, SignalLocation,Data Frame]=SynchFinal(Status,
FramesSkip, SignalLocation, DataFrame,A,C);
%
%   SynchFinal.m
%
%   The SynchFinal.m is a Matlab file which illustrates the time alignment algorithm
%   developed in Vpacket Communications, Inc to measure the voice quality over a
%   Packet Network using a TI TMS320C54 in real-time. The algorithm first reads
%   the marker from buffer A, converts it from u-law to linear, and scale it down. The
%   buffer C contains the most recent data received from the packet network are also
%   converted from u-law to linear, and scaled down to avoid overflow or saturation
%   on a fix-point TI TMS320C54. The cross-correlation between the receiving
%   buffer and each of the 20 frame marker is performed, the maximum cross-
%   correlation score and its index in the cross-correlation buffer for each frame is
%   saved. Later, the ultimate maximum in cross-correlation score cross 20 frames is
%   retrieved along with the frame index and its location index within a frame. The
%   ultimate maximum score is then used to test against a threshold. If the threshold
%   is exceeded, then the frame index and location index are then used to determine
%   number of frames to skipped, and the exact location to read the signal from. Once
%   the presence of the marker is detected, then it enters into the stage to skip the rest
%   frames of the marker is skipped. After the marker is skipped, it starts to copy data
%   from the receive buffer to a synchronized circular buffer. If the first frame only
%   contains a portion of the signal, only copy the portion into the buffer, otherwise,
%   copy the entire frame.
%   To make the time alignment algorithm clean and modular, this was implemented
%   as a function in Matlab, the example and test codes are can be implemented
%   easily, and are thus not included since it is not described in the patent. but this
%   implementation requires to store, or return several parameters because they don't
%   exist after the function exits. In C implementation, these parameters can be
%   implemented as "static", this reduces many parameters used in this function.
%   However the main body of the function remains same.
%
%   Input:
%
%   Status: The algorithm status, in cross-correlation, skip frame, or copy
%   synchronized data
%   FrameSkip: After the marker is detected, the rest frames of marker needs to be
%   skipped.
%   SignalLocation: The exact location where the marker starts.
%   DataFrame: = 0 if it is the first data frame, =1 otherwise.
%   StopIndex = the location where the 1st frame data ends.
%   A: the buffer which stores the marker.
%   C: the buffer which stores the most recent frame of data from the IP network.
%   Output:
%
%   Status: The algorithm status, in cross-correlation, skip frame, or copy
%   synchronized data
%   FrameSkip: After the marker is detected, the rest frames of marker needs to be
%   skipped.
%   SignalLocation: The exact location where the marker starts.
%   DataFrame: = 0 if it is the first data frame, =1 otherwise.
%   StopIndex = the location where the 1st frame data ends.
%   Note: RxSynchBuffer contains the synchronized test signal for voice quality test
```

APPENDIX A-continued

```
%   The buffers used in this Algorithm (Please refer to the Figure on the buffer
%   involved in this patent).
%   Buffers:
%
%   Buffer A: Stores the marker in u-law format.
%   Buffer ALIN: Buffer 538 in FIG. 5, which stores the scaled marker which is
%   converted into linear format, each time, one out of 20 frames of the marker is used
%   to calculate cross correlation scores until all frames of marker are used for the
%   calculation.
%   Buffer C: Buffer 532 or 534 in FIG. 5, it stores the data received from the packet
%   network.
%   Buffer CLIN: Buffer 536 in FIG. 5 It stores the most recent frame of data in a 256-
%   word circular buffer, and convert it from u-law to linear format and scale it down.
%   Buffer c: Buffer 540 in FIG. 5, it stores the cross-correlation results.
%   Buffer MaxCorrelation: Buffer 552 in FIG. 5, the 20-word buffer to store the
%   maximum cross-correlation result per Frame.
%   Buffer MaxCorrelationIndex: Buffer 554 in FIG. 5, the 20-word buffer to store the
%   index of the maximum cross-correlation result per Frame.
%   Buffer SynchDataBuffer:the 128-word synchronized buffer which stores the test
%   signal for PSQM measurement.
%   Copyright 1999–2001 Vpacket Communications, Inc.
%   Author: W. Wang
%   $Revision: 1.1 $ $Date: 2001/04/23
    CorrelationThreshold=32;
    FramesMarker=20;
    SamplesPerFrame=128;
%   The marker is assumed be loaded into buffer A, then it is converted from u-law to
%   linear, and scale it down. Both the marker and signal in the receiving buffers are
%   scaled down to avoid data overflow or saturation in calculation of Cross-
%   Correlation.
    ALIN=mu2lin(A)/128;
%   The data connected from the network is assumed store in buffer C, and then is
%   convert from u-law to linear, and scale it down.
    CLIN = mu2lin(C)/128;
%   Compute the Cross-Correlation between the data in Frame CLIN and each of the
%   20-frame chirp signal.
%   If the marker is not present, keep checking
    if (Status==0)
        for FrameIndex=1:1:FramesMarker
            c=xcorr(ALIN((FrameIndex-1)*SamplesPerFrame+1:(FrameIndex-1)
            *SamplesPerFrame+SamplesPerFrame),CLIN(1:SamplesPerFrame));
%   Retrieve and store the max correlation score and its corresponding index per
%   frame
            [MaxCorrelation(FrameIndex), MaxCorrelationIndex(FrameIndex)] =
            max (c);
        end;
%   Retrieve and store the max correlation score and its corresponding index cross all
%   frames
        [MaxAllFrames,MaxAllFramesIndex] = max(MaxCorrelation);
        MaxLocation = MaxCorrelationIndex(MaxAllFramesIndex);
%   Check whether the max correlation number exceeds the threshold
        if(MaxAllFrames>CorrelationThreshold)
%   The frames of marker that should be skipped.
            FramesSkip = FramesMarker – MaxAllFramesIndex;
%   The onset of the marker in a 128-sample buffer, The onset of the test signal which
%   follows the marker can then be determined by skipping the rest of the marker, and
%   read from the location which is determined by SignalLocation.
            offset = fix(MaxLocation-SamplesPerFrame);
            if(offset>0)
                SignalLocation = SamplesPerFrame-offset;
            else
                SignalLocation = abs(offset);
            end
%   trigger the stage to skip the rest of marker
            Status=1;
        end;
    end
%   The code to skip the rest of the marker starts from here, once the marker is
%   detected.
    if(Status==1)
%   The last frame of the marker, then the next frame is the data
        if(FramesSkip==-1)
            Status=2;
%   Keep skipping the marker until the data is present
        else
            FramesSkip = FramesSkip-1;
        end;
    end;
%   The code to copy the test signal(Male voice) starts from here.
```

APPENDIX A-continued

```
        if(Status==2)
%   The numbers of data in the first frame might be fewer than SamplesPerFrame
%   (128). Special care is needed to avoid copy wrong data, and save the index for the
%   last stored sample.
            if (DataFrame == 0)
                for dataindex = 1:1:(SamplesPerFrame − SignalLocation)
                    SynchDataBuffer(dataindex)=
                    CLIN(dataindex+SignalLocation);
                end;
                DataFrame = 1;
%   The data in other frames needed to be copied into a circular SynchDataBuffer, the
%   voice quality measurement algorithm can start to process the synchdatabuffer
%   frame by frame.
            else
                StopIndex = (SamplesPerFrame − SignalLocation);
                for dataindex=1:1:SamplesPerFrame
                    if (StopIndex+dataindex>SamplesPerFrame)
                        SynchDataBuffer(StopIndex+dataindex−
                        SamplesPerFrame)=CLIN(dataindex);
                    else
                        SynchDataBuffer(StopIndex+dataindex)=
                        CLIN(dataindex);
                    end
                end;
            end;
    end;
```

What is claimed is:

1. A method for measuring voice quality of a communication network, comprising:

providing a reference marker that indicates onset time of a reference voice test signal, and the reference voice test signal;

receiving through the network packets containing a transmitted marker and a transmitted voice test signal through the network;

comparing the transmitted marker with the reference marker, or portions thereof, to ascertain onset time of the transmitted voice test signal in the packets received; and processing the transmitted voice test signal and the reference voice test signal to measure quality of the network.

2. The method of claim 1, wherein the comparison of the markers includes cross-correlating the markers to obtain a score.

3. The method of claim 2, wherein the comparison of the markers includes comparing the cross-correlation score with a threshold.

4. The method of claim 3, wherein a relative timing offset between the transmitted marker and the reference marker corresponding to a cross-correlation score that exceeds the threshold yields information concerning the onset time of the transmitted voice test signal.

5. The method of claim 2, wherein the transmitted marker is in μ-law format, and the comparison of the markers includes converting the marker from μ-law to linear format.

6. The method of claim 1, wherein said providing provides a reference marker that includes a signal having a frequency that changes continuously with time.

7. The method of claim 6, wherein said comparing and processing are performed at a sampling frequency F, wherein said providing provides a reference marker that has N samples and that is a signal y given by:

$$y = \cos\left(2\pi\left(f_0 + \frac{(f1 - f0)t}{T_1}\right)t\right)$$

where
f0=Onset frequency;
f1=Offset frequency;
$T_1$=(N−1)/F; and
t=t+1/F, and $0 \leq t \leq T_1$.

8. The method of claim 1, wherein said transmitted marker is divided into portions such that each portion thereof contains information concerning the onset, wherein each of at least some of said received packets contains one of the portions of the transmitted marker, and wherein said comparing compares the portion of the transmitted marker in each of the at least some of said received packets to the reference marker after such packet is received, so that information concerning onset time becomes available prior to receipt of packets containing the entire transmitted marker.

9. The method of claim 1, wherein said providing provides a marker that is not more than 5 seconds in duration.

10. The method of claim 1, further comprising transmitting packets containing the transmitted marker and transmitted voice test signal from a first device to a second device through the network, wherein the receiving and processing are associated with the second device.

11. The method of claim 1, further comprising transmitting packets containing the transmitted marker and transmitted voice test signal from a first device to a second device through the network and transmitting such packets from the second device back to the first device, wherein the receiving and processing are associated with the first device.

12. The method of claim 1, wherein said reference marker is divided into portions, said transmitted marker being also divided into portions such that the portions of the transmitted marker are received consecutively, wherein said comparing cross-correlates a current portion of the transmitted marker after it is received and before a next portion is received with each portion of the reference marker, and stores a score of the cross-correlation.

13. The method of claim 12, wherein said comparing further comprises comparing the scores from cross-correlation of the current portion with the different portions of the reference marker, selects a maximum score from such scores and compares the maximum score with a threshold.

14. The method of claim 13, wherein said comparing cross-correlates the current portion with the different portions of the reference marker consecutively, compares the cross-correlation score obtained in each of such cross-correlations with a previously stored score, if any, and replaces the previously stored score, if any, with a current one if it is greater than the previously stored score.

15. A method for measuring voice quality of a communication network, comprising: providing a reference voice test signal;

receiving through the network packets containing a transmitted voice test signal through the network, said transmitted voice test signal being divided into portions, wherein each of at least some of said received packets contains one of the portions of the transmitted voice test signal; and processing the transmitted voice test signal in the packets received and the reference voice test signal to measure quality of the network, and wherein said processing processes the portion of the transmitted voice test signal in each of the at least some of said received packets and the reference voice test signal after such packet is received, so that information concerning quality of the network becomes available after receipt of packet(s) containing said portion(s) and before receipt of packets containing all of the portions of the transmitted voice test signal.

16. The method of claim 15, wherein said processing includes normalizing the portion of the transmitted voice test signal in one of said received packets prior to receipt of at least one packet containing at least another portion of the transmitted voice test signal.

17. The method of claim 16, further comprising:

providing a reference marker that indicates onset time of the reference voice test signal; and receiving through the network packets containing a transmitted marker; wherein said processing including computing a normalization factor from the powers of the reference and transmitted markers and wherein said normalizing normalizes by means of the factor.

18. The method of claim 16, wherein said normalizing computes a normalization factor using a weighted average of power of a previously received portion and power of currently received portion of the transmitted voice test signal.

19. The method of claim 15, wherein information concerning quality of the network becomes available after receipt of at least one packet containing at least one portion of the transmitted voice test signal.

20. The method of claim 15, further comprising transmitting packets containing the transmitted voice test signal from a first device to a second device through the network, wherein the receiving and processing are associated with the second device.

21. The method of claim 15, further comprising transmitting packets containing the transmitted voice test signal from a first device to a second device through the network and transmitting such packets from the second device back to the first device, wherein the receiving and processing are associated with the first device.

22. A method for measuring voice quality of a communication network, comprising:

causing a first VOPN device to communicate with a second VOPN device through the network;

transmitting data packets from the first VOPN device to the second VOPN device through the network, said packets containing a voice test signal;

receiving the transmitted packets through the network;

processing the voice test signal in the transmitted packets received and a reference voice test signal to measure quality of the network; and transmitting the packets transmitted from the first device and received by the second device back to the first device, wherein the receiving and processing are associated with the first device.

23. A method for measuring voice quality of a communication network, comprising:

causing a first VOPN device to communicate with a second VOPN device through the network;

transmitting data packets from the first VOPN device to the second VOPN device through the network, said packets containing a voice test signal;

receiving the transmitted packets through the network;

processing the voice test signal in the transmitted packets received and a reference voice test signal to measure quality of the network; and wherein said transmitting transmits packets containing a marker followed by the voice test signal, said method further comprising comparing the transmitted marker or a portion thereof with at least a portion of a reference marker to identify an onset time of the transmitted voice test signal prior to the 20 processing.

24. A method for measuring voice quality of a communication network, comprising:

causing a first VOPN device to communicate with a second VOPN device through the network;

transmitting data packets from the first VOPN device to the second VOPN device through the network, said packets containing a voice test signal;

receiving the transmitted packets through the network;

processing the voice test signal in the transmitted packets received and a reference voice test signal to measure quality of the network; and wherein said processing makes use of the onset time of the transmitted voice test signal.

25. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network; and wherein said processor provides a reference voice test signal and also a reference marker that indicates onset time of the reference voice test signal to the bus for transmission to another VOPN device.

26. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network; and wherein said device transmits packets containing the reference marker and the reference voice test signal to another device through the network.

27. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network; and wherein said processor compares the reference marker transmitted to and returned by another device and the reference marker and processes the reference voice test signal transmitted to and returned by another device with the reference voice test signal to measure the quality of the network.

28. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network; and wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network.

29. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein the comparison of the markers includes cross-correlating the markers to obtain a cross-correlation score and comparing the cross-correlation score with a threshold.

30. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein the comparison of the markers includes cross-correlating the markers to obtain a cross-correlation score and comparing the cross-correlation score with a threshold; and wherein a relative timing offset between onset times of the transmitted and reference markers corresponding to a cross-correlation score that exceeds the threshold yields information concerning the onset time of the transmitted voice test signal.

31. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein the transmitted marker is in μ-law format, and the comparison of the markers includes converting the transmitted marker from μ-law to linear format.

32. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein said transmitted marker is divided into portions such that each portion thereof contains information concerning the onset time of 10 the transmitted voice test signal, wherein each of at least some of said received packets contains one of the portions of the transmitted marker, and wherein said processor compares the portion of the transmitted marker in each of the at least some of said received packets to the reference marker after such packet is received, so that information concerning onset time becomes available prior to receipt of packets containing the entire transmitted marker.

33. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein said processor compares a marker transmitted by another device with the reference marker and processes the reference voice test signal and a voice test signal transmitted from another device to measure the quality of the network.

34. A VOPN device for sending data packets containing voice signals through a communication network, comprising:

a CPU;

a bus camming voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein said reference marker is divided into portions, wherein said transmitted marker is also divided into portions such that the portions of the transmitted marker are received consecutively, and wherein said processor cross-correlates a current portion of the transmitted marker after it is received and before a next portion is received with each portion of the reference marker, and stores a score of the cross-correlation.

35. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said reference marker is divided into portions, wherein said transmitted marker is also divided into portions such that the portions of the transmitted marker are received consecutively, and wherein said processor cross-correlates a current portion of the transmitted marker after it is received and before a next portion is received with each portion of the reference marker, and stores a score of the cross-correlation; and wherein said processor compares the scores from cross-correlation of the current portion with the different portions of the reference marker, selects a maximum score from such scores and compares the maximum score with a threshold.

36. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said reference marker is divided into portions, wherein said transmitted marker being also divided into portions such that the portions of the transmitted marker are received consecutively, and wherein said processor cross-correlates a current portion of the transmitted marker after it is received and before a next portion is received with each portion of the reference marker, and stores a score of the cross-correlation;

wherein said processor compares the scores from cross-correlation of the current portion with the different portions of the reference marker, selects a maximum score from such scores and compares the maximum score with a threshold; and wherein said processor cross-correlates the current portion with the different portions of the reference marker consecutively, compares the cross-correlation score obtained in each of such cross-correlations with a previously stored score, if any, and replaces the previously stored score, if any, with a current one if it is greater than the previously stored score.

37. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least some of said received packets and the reference voice test signal after such packet is received, so that information concerning quality of the network becomes available after receipt of packet(s) containing said portion(s) and before receipt of packets containing all of the portions of the transmitted voice test signal.

38. A VOPN device for sending data packets containing voice signals through a communication network, comprising:

a CPU;

a bus camming voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least some of said received packets and the reference voice test signal after such packet is received, so that information concerning quality of the network becomes available after receipt of packet(s) containing said portion(s) and before receipt of packets containing all of the portions of the transmitted voice test signal; and wherein said processor normalizes the portion of the transmitted voice test signal in one of said received packets prior to receipt of at least one packet containing at least another portion of the transmitted voice test signal.

39. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least some of said received packets and the reference voice test signal after such packet is received, so that information concerning quality of the network becomes available after receipt of packet(s) containing said portion(s) and before receipt of packets containing all of the portions of the transmitted voice test signal;

wherein said processor normalizes the portion of the transmitted voice test signal in one of said received packets prior to receipt of at least one packet containing at least another portion of the transmitted voice test signal; and wherein the processor provides a reference marker indicating onset time of the reference voice test signal, wherein the device receives through the network packets containing a transmitted marker, and wherein said processor computes a normalization factor from the powers of the reference and transmitted markers and wherein said normalizing normalizes by means of the factor.

40. A VOPN device for sending data packets containing voice signals through a communication network, comprising:

a CPU;

a bus carrying voice data;

a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least some of said received packets and the reference voice test signal after such packet is received, so that information concerning quality of the network becomes available after receipt of packet(s) containing said portion(s) and before receipt of packets containing all of the portions of the transmitted voice test signal;

wherein said processor normalizes the portion of the transmitted voice test signal in one of said received packets prior to receipt of at least one packet containing at least another portion of the transmitted voice test signal; and wherein said processor computes a normalization factor using a weighted average of power of a previously received portion and power of currently received portion of the transmitted voice test signal.

41. A VOPN device for sending data packets containing voice signals through a communication network, comprising:
a CPU;
a bus carrying voice data;
a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least some of said received packets and the reference voice test signal after such packet is received, so that information concerning quality of the network becomes available after receipt of packet(s) containing said portion(s) and before receipt of packets containing all of the portions of the transmitted voice test signal; and wherein information concerning quality of the network becomes available after receipt of at least one packet containing at least one portion of the transmitted voice test signal.

42. A VOPN device for sending data packets containing voice signals through a communication network, comprising:
a CPU;
a bus carrying voice data;
a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network; and wherein said processor provides a reference marker that includes a signal having a frequency that changes continuously with time.

43. A VOPN device for sending data packets containing voice signals through a communication network, comprising:
a CPU;
a bus carrying voice data;
a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network;

wherein said processor provides a reference marker that includes a signal having a frequency that changes continuously with time;

wherein said processor operates at a sampling frequency F, and wherein said processor provides a reference marker that has N samples and that is a signal y given by:

$$y = \cos\left(2\pi\left(f_0 + \frac{(f1-f0)t}{T_1}\right)t\right)$$

where
f0=Onset frequency;
f1=Offset frequency;
$T_1$=(N−1)/F; and
t=t+1/F, and $0 \leq t \leq T_1$.

44. A VOPN device for sending data packets containing voice signals through a communication network, comprising:
a CPU;
a bus carrying voice data;
a voice quality module in communication with the CPU and the bus, said module comprising a processor that provides a reference voice test signal to the bus for transmission to another VOPN device, or that processes a transmitted voice test signal received by the device through the network and a reference voice test signal to test the quality of the network; and wherein said processor provides a reference marker that is not more than 5 seconds in duration.

45. A voice quality module for use with a VOPN device for testing quality of a communication network through which data packets containing voice signals are sent to and from the device, said device comprising a CPU and a bus carrying voice data; said module comprising:
- a processor that provides a reference voice test signal to the bus for transmission to another VOPN device, or that processes a transmitted voice test signal received by the device through the network with a reference voice test signal to test the quality of the network; and
- wherein said processor provides a reference voice test signal and also a reference marker that indicates onset time of the reference voice test signal to the bus for transmission to another VOPN device.

46. A voice quality module for use with a VOPN device for testing quality of a communication network through which data packets containing voice signals are sent to and from the device, said device comprising a CPU and a bus carrying voice data; said module comprising:
- a processor that provides a reference voice test signal to the bus for transmission to another VOPN device, or that processes a transmitted voice test signal received by the device through the network with a reference voice test signal to test the quality of the network;
- wherein said processor provides a reference voice test signal and also a reference marker that indicates onset time of the reference voice test signal to the bus for transmission to another VOPN device; and
- wherein said device transmits packets containing the reference marker and the reference voice test signal to another device through the network, and wherein said processor compares the reference marker transmitted to and returned by another device with the reference marker and processes the reference voice test signal transmitted to and returned by another device with the reference voice test signal to measure the quality of the network.

47. A voice quality module for use with a VOPN device for testing quality of a communication network through which data packets containing voice signals are sent to and from the device, said device comprising a CPU and a bus carrying voice data; said module comprising:
- a processor that provides a reference voice test signal to the bus for transmission to another VOPN device, or that processes a transmitted voice test signal received by the device through the network with a reference voice test signal to test the quality of the network; and
- wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network.

48. A voice quality module for use with a VOPN device for testing quality of a communication network through which data packets containing voice signals are sent to and from the device, said device comprising a CPU and a bus carrying voice data; said module comprising:
- a processor that provides a reference voice test signal to the bus for transmission to another VOPN device, or that processes a transmitted voice test signal received by the device through the network with a reference voice test signal to test the quality of the network;
- wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and
- wherein the comparison of the markers includes cross-correlating the markers to obtain a cross-correlation score and comparing the cross-correlation score with a threshold.

49. A voice quality module for use with a VOPN device for testing quality of a communication network through which data packets containing voice signals are sent to and from the device, said device comprising a CPU and a bus carrying voice data; said module comprising:
- a processor that provides a reference voice test signal to the bus for transmission to another VOPN device, or that processes a transmitted voice test signal received by the device through the network with a reference voice test signal to test the quality of the network;
- wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;
- wherein the comparison of the markers includes cross-correlating the markers to obtain a cross-correlation score and comparing the cross-correlation score with a threshold; and
- wherein a relative timing offset between onset times of the transmitted and reference markers corresponding to a cross-correlation score that exceeds the threshold yields information concerning the onset time of the transmitted voice test signal.

50. A voice quality module for use with a VOPN device for testing quality of a communication network through which data packets containing voice signals are sent to and from the device, said device comprising a CPU and a bus carrying voice data; said module comprising:
- a processor that provides a reference voice test signal to the bus for transmission to another VOPN device, or that processes a transmitted voice test signal received by the device through the network with a reference voice test signal to test the quality of the network;
- wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and
- wherein the transmitted marker is in $\mu$-law format, and the comparison of the markers includes converting the transmitted marker from $\mu$-law to linear format.

51. A voice quality module for use with a VOPN device for testing quality of a communication network through which data packets containing voice signals are sent to and from the device, said device comprising a CPU and a bus carrying voice data; said module comprising:
- a processor that provides a reference voice test signal to the bus for transmission to another VOPN device, or that processes a transmitted voice test signal received by the device through the network with a reference voice test signal to test the quality of the network;
- wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein said transmitted marker is divided into 15 portions such that each portion thereof contains information concerning the onset time of the transmitted voice test signal, wherein each of at least some of said received packets contains one of the portions of the transmitted marker, and wherein said processor compares the portion of the transmitted marker in each of the at least some of said received packets to the reference marker after such packet is received, so that information concerning onset time becomes available prior to receipt of packets containing the entire transmitted marker.

52. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein said processor compares a marker transmitted by another device with the reference marker and processes the reference voice test signal and a voice test signal transmitted from another device to measure the quality of the network.

53. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network, and wherein said reference marker is divided into portions, wherein said transmitted marker is also divided into portions such that the portions of the transmitted marker are received consecutively, and wherein said processor cross-correlates a current portion of the transmitted marker after it is received and before a next portion is received with each portion of the reference marker, and stores a score of the cross-correlation.

54. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said reference marker is divided into portions, wherein said transmitted marker is also divided into portions such that the portions of the transmitted marker are received consecutively, and wherein said processor cross-correlates a current portion of the transmitted marker after it is received and before a next portion is received with each portion of the reference marker, and stores a score of the cross-correlation; and wherein said processor compares the scores from cross-correlation of the current portion with the different portions of the reference marker, selects a maximum score from such scores, and compares the maximum score with a threshold.

55. A voice quality module for use with a VOPN device for testing quality of a communication network through which data packets containing voice signals are sent to and from the device, said device comprising a CPU and a bus carrying voice data, said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said reference marker is divided into portions, wherein said transmitted marker is also divided into portions such that the portions of the transmitted marker are received consecutively, and wherein said processor cross-correlates a current portion of the transmitted marker after it is received and before a next portion is received with each portion of the reference marker, and stores a score of the cross-correlation;

wherein said processor compares the scores from cross-correlation of the current portion with the different portions of the reference marker, selects a maximum score from such scores, and compares the maximum score with a threshold; and wherein said processor cross-correlates the current portion with the different portions of the reference marker consecutively, compares the cross-correlation score obtained in each of such cross-correlations with a previously stored score, if any, and replaces the previously stored score, if any, with a current one if it is greater than the previously stored score.

56. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network; and wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least 20 some of said received packets and the reference voice test signal after such packet is received, so that information concerning quality of the network becomes available after receipt of packet(s) containing said portion(s) and before receipt of packets containing all of the portions of the transmitted voice test signal.

57. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least 20 some of said received packets and the reference voice test signal after such packet is received, so that information concerning quality of the network becomes available after receipt of packet(s) containing said portion(s) and before receipt of packets containing all of the portions of the transmitted voice test signal; and wherein said processor normalizes the portion of the transmitted voice test signal in one of said received packets prior to receipt of at least one packet containing at least another portion of the transmitted voice test signal.

58. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least 20 some of said received packets and the reference voice test signal after such packet is received, so that information concerning quality of the network becomes available after receipt of packet(s) containing said portion(s) and before receipt of packets containing all of the portions of the transmitted voice test signal;

said processor normalizing the portion of the transmitted voice test signal in one of said received packets prior to receipt of at least one packet containing at least another portion of the transmitted voice test signal; and wherein the processor provides a reference marker indicating onset time of the reference voice test signal, the device receiving through the network packets containing a transmitted marker, wherein said processor computes a normalization factor from the powers of the reference and transmitted markers and wherein said normalizing normalizes by means of the factor.

59. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least 20 some of said received packets and the reference voice test signal after such packet is received, so that information concerning quality of the network becomes available after receipt of packet(s) containing said portion(s) and before receipt of packets containing all of the portions of the transmitted voice test signal;

said processor normalizing the portion of the transmitted voice test signal in one of said received packets prior to receipt of at least one packet containing at least another portion of the transmitted voice test signal; and wherein said processor computes a normalization factor using a weighted average of power of a previously received portion and power of currently received portion of the transmitted voice test signal.

60. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor processes the reference and transmitted voice test signals, and compares a transmitted marker received by the device through the network with a reference marker to identify a timing offset between onset times of the reference and transmitted voice test signals and processes the two voice test signals to measure the quality of the network;

wherein said device receives through the network packets containing the transmitted voice test signal, said transmitted voice test signal being divided into portions, wherein each of at least some of said received packets contains one of the portions of the transmitted voice test signal, and wherein said processor processes the portion of the transmitted voice test signal in each of the at least 20 some of said received packets and the reference voice test signal after such packet is received, so that information concerning quality of the network becomes available after receipt of packet(s) containing said portion(s) and before receipt of packets containing all of the portions of the transmitted voice test signal; and wherein information concerning quality of the network becomes available after receipt of at least one packet containing at least one portion of the transmitted voice test signal.

61. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network; and wherein said processor provides a reference marker that includes a signal having a frequency that changes continuously with time.

62. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network;

wherein said processor provides a reference marker that includes a signal having a frequency that changes continuously with time; and wherein said processor operates at a sampling frequency F, wherein said processor provides a reference marker that has N samples and that is a signal y given by:

$$y = \cos\left(2\pi\left(f_0 + \frac{(f1-f0)t}{T_1}\right)t\right)$$

where
f0=Onset frequency;
f1=Offset frequency;
$T_1$=(N−1)/F; and
t=t+1/F, and $0 \leq t \leq T_1$.

63. A voice quality module for use with a VOPN device for testing quality of a communication network through which data packets containing voice signals are sent to and from the device, said device comprising a CPU and a bus carrying voice data; said module comprising:

a processor that provides a reference voice test signal to the bus for transmission to another VOPN device, or that processes a transmitted voice test signal received by the device through the network with a reference voice test signal to test the quality of the network; and wherein said processor provides a reference marker that is not more than 5 seconds in duration.

64. A method for measuring voice quality of a communication network comprising:

providing a reference marker that indicates onset time of a reference voice test signal, and the reference voice test signal; and transmitting to a device through the network packets containing the reference marker and a reference voice test signal through the network.

65. A method for measuring voice quality of a communication network, comprising:

providing a reference marker that indicates onset time of a reference voice test signal, and the reference voice test signal; and receiving through the network packets containing a transmitted marker and a transmitted voice test signal through the network.

66. The method of claim 65, further comprising comparing the transmitted marker with the reference marker, or portions thereof, to ascertain onset time of the transmitted voice test signal in the packets received.

67. The method of claim 66, further comprising processing the transmitted voice test signal and the reference voice test signal to measure quality of the network.

* * * * *